United States Patent [19]
Hamilton et al.

[11] Patent Number: 5,230,531
[45] Date of Patent: Jul. 27, 1993

[54] GAS GENERATOR IGNITION ASSEMBLY USING A PROJECTILE

[75] Inventors: Brian K. Hamilton; Ronald J. Butt, both of Littleton; Brent A. Parks, Englewood, all of Colo.

[73] Assignee: OEA, Inc., Aurora, Colo.

[21] Appl. No.: 817,455

[22] Filed: Jan. 6, 1992

Related U.S. Application Data

[63] Continuation-in-part of Ser. No. 697,900, May 9, 1991, abandoned, which is a continuation-in-part of Ser. No. 663,264, Mar. 1, 1991, Continuation-in-part of Ser. No. 601,365, Oct. 22, 1990, Pat. No. 5,078,422.

[51] Int. Cl.⁵ .................... B60R 21/26; B67D 5/00
[52] U.S. Cl. .............................. 280/737; 222/5
[58] Field of Search ............... 222/5; 280/736, 737, 280/741, 742; 441/93, 94; 137/68.2

[56] References Cited

U.S. PATENT DOCUMENTS

| | | | |
|---|---|---|---|
| 2,672,144 | 3/1954 | Cohen | 128/265 |
| 2,733,836 | 2/1956 | Switzer | 222/82 |
| 2,944,268 | 7/1960 | Fruendt | 9/9 |
| 3,477,740 | 11/1969 | Hass | 280/150 |
| 3,567,245 | 3/1971 | Ekstrom | 280/150 |
| 3,618,980 | 11/1971 | Leising et al. | 280/150 |
| 3,648,898 | 3/1972 | Day | 222/5 |
| 3,653,684 | 4/1972 | Plumer | 280/150 |
| 3,690,695 | 9/1972 | Jones, Sr. | 280/150 |
| 3,731,843 | 5/1973 | Anderson, Jr. | 222/3 |
| 3,756,621 | 9/1973 | Lewis et al. | 280/150 |
| 3,773,353 | 11/1973 | Trowbridge et al. | 280/150 |
| 3,774,807 | 11/1973 | Keathley et al. | 222/3 |
| 3,788,667 | 1/1974 | Vancil | 280/150 |
| 3,822,895 | 7/1974 | Ochiai | 280/150 |
| 3,836,170 | 9/1974 | Grosch et al. | 280/150 |
| 3,869,143 | 3/1975 | Merrell | 280/150 |
| 3,877,381 | 4/1975 | McCoy | 102/92.4 |
| 3,887,108 | 6/1975 | McDaniel et al. | 222/1 |
| 3,895,821 | 7/1975 | Schotthoefer et al. | 280/150 |
| 3,900,211 | 8/1975 | Russell et al. | 280/150 |
| 3,910,596 | 10/1975 | Wulbrecht et al. | 280/150 AB |
| 3,915,236 | 10/1975 | Stichling | 222/5 X |
| 3,938,704 | 2/1976 | Milgram | 222/5 |
| 3,948,540 | 4/1976 | Meacham | 280/150 |
| 3,966,226 | 6/1976 | Roth | 280/737 |
| 3,966,228 | 6/1976 | Neuman | 280/737 |
| 4,018,457 | 4/1977 | Marlow | 280/735 |
| 4,046,156 | 9/1977 | Cook | 137/68 |
| 4,050,483 | 9/1977 | Bishop | 141/4 |
| 4,114,924 | 9/1978 | Kasagi et al. | 280/740 |
| 4,289,327 | 9/1981 | Okada | 280/737 |
| 4,380,346 | 4/1983 | Davis et al. | 280/736 |
| 4,572,077 | 2/1986 | Antoine et al. | 102/439 |
| 5,060,974 | 10/1991 | Hamilton et al. | 280/736 |
| 5,076,607 | 12/1991 | Woods et al. | 280/737 |
| 5,078,422 | 1/1992 | Hamilton et al. | 280/736 |
| 5,131,680 | 7/1992 | Coultas et al. | 280/741 X |

Primary Examiner—Andres Kashnikow
Assistant Examiner—Anthoula Pomrening
Attorney, Agent, or Firm—Sheridan, Ross & McIntosh

[57] ABSTRACT

An ignition assembly in a motor vehicle inflatable safety system is provided, preferably to be used with a projectile. In one embodiment, the ignition assembly includes an actuation piston and an activator, such as a percussion primer(s) and an ignition material, which are separated by a retention pin. When a sufficient force is exerted on the actuation piston, the retention pin fails such that the actuation piston moves and impacts the percussion primer(s) to ignite the propellant within the gas generator. The resulting propellant gases are thereafter provided in a predetermined direction(s). Advantageously, a check valve-like device is employed to substantially reduce the flow of propellant gases in a direction other than the predetermined direction(s). The preferred projectile also includes a body that has a smaller dimension than the projectile piercing head when the projectile is used to separate a closure disk to release stored, pressurized gases in addition to activating the gas generator. In this case, the preferred projectile facilitates the controlled separation of any closure disk used to retain pressurized, stored gases used by the inflator in addition to the propellant gases.

46 Claims, 14 Drawing Sheets

GAS GENERATOR IGNITION ASSEMBLY USING A PROJECTILE

RELATED APPLICATIONS

This application is a continuation-in-part of U.S. patent application Ser. No. 07/697,900, filed May 9, 1991, now abandoned and entitled "DUAL FUNCTION PROJECTILE FOR INITIATING INFLATION OF A MOTOR VEHICLE SAFETY SYSTEM", and U.S. patent application Ser. No. 07/601,365, filed Oct. 22, 1990, now U.S. Pat. No. 5,708,422, issued Jan. 7, 1992, and entitled "GAS INFLATOR APPARATUS", Ser. No. 07/697,900 being a continuation-in-part of U.S. patent application Ser. No. 07/663,264, filed Mar. 1, 1991, and entitled "PROJECTILE FOR INITIATING INFLATION OF A MOTOR VEHICLE INFLATABLE SAFETY SYSTEM".

FIELD OF THE INVENTION

This invention generally relates to the field of motor vehicle inflatable safety systems and, more particularly, to a gas generator ignition assembly in which an actuation piston is dislodged to move into engagement with an activator to ignite a propellant.

BACKGROUND OF THE INVENTION

Inflatable safety systems for motor vehicles have undergone significant development efforts in recent years due in part to an increased awareness as to their effectiveness. These inflatable safety systems are typically activated upon receipt of a signal from an appropriate detector or sensor which indicates that inflation of the confinement is required. A variety of inflators are used by these systems to expand the confinement in a manner which provides certain advantages. Many systems initiate inflation by "removing" an isolation between the confinement and the inflator. Thereafter, some inflating medium, whether it be pressurized gases, gases generated by combustion of a propellant, a mixture thereof, or other suitable fluids, is supplied to the confinement.

A portion of the development efforts for inflatable safety systems have concentrated upon or at least addressed controlling the flow from the inflator to the confinement after inflation has been initiated. In order to provide a reliable inflatable safety system, not only must there be a sufficient flow of the inflating medium to the confinement in a timely manner, but the confinement itself must remain structurally intact throughout operation. One proposed alternative for achieving these two fundamental objectives concentrates on the material selection for various components of the inflator.

U.S. Pat. No. 3,567,245 to Ekstrom, issued Mar. 2, 1971, discloses utilizing certain materials for the barrier which provides the initial isolation between the inflator and the confinement. In one embodiment, the isolating barrier is a friable or fragmentable material which is disintegrated or comminuted by the activation of an explosive device positioned therewithin to initiate inflation. The resultant materials, which are apparently of a sufficiently small size, are then forced through various passageways by the exiting pressurized fluid used for inflation and thus presumably enter the confinement. The utilization of an elastomeric material, particularly an RTV rubber, in this type of configuration is also suggested since the resultant materials allegedly do not damage the confinement due to their resiliency. Another embodiment includes an isolating barrier having preformed grooves thereon such that when the explosive device is activated, the barrier breaks into sections defined by the grooves. These resultant sections are able to pass through the passageways so as to not block the flow of fluid to the confinement, and thus also presumably enter the confinement.

U.S. Pat. No. 3,900,211 to Russell et al., issued Aug. 19, 1975, discloses selecting an appropriate material for the component used to release a poppet to initiate inflation. Generally, a poppet is positioned in a discharge conduit connected to a source of pressurized fluid to initially prohibit flow therefrom. A support tube assists in maintaining the poppet in this closed position and also separates the poppet from a pyrotechnic charge. Upon receiving a signal that inflation is required, the pyrotechnic charge is activated to disintegrate the support tube. The pressure exerted on the face of the poppet by the stored fluid thereafter moves the poppet to expose a discharge outlet to initiate the flow. Due to the positioning of the support tube between the poppet and the pyrotechnic charge and the travel of the poppet toward the charge after the activation thereof, the disclosure indicates that there is no expulsion of support tube or pyrotechnic residue in the fluid stream.

In recognition that fragments or other foreign materials generated upon activation of the inflator may enter into the flow and adversely affect the overall performance of the inflatable safety system, such as by restricting the flow rate through blocking passageways to the confinement or by damaging the confinement when propelled against the interior surfaces thereof, filtering-type devices were incorporated to remove these fragments and other foreign materials. U.S. Pat. Nos. 3,618,980 to Leising et al., issued Nov. 9, 1971; 3,822,895 to Ochiai, issued Jul. 9, 1974; and 4,114,924 to Kasagi et al., issued Sep. 19, 1978, are representative of these efforts. Leising et al. discloses in one embodiment the positioning of a vane structure between a propellant chamber and an inflatable bag. When a collision is sensed and the propellant within the propellant chamber is ignited, the by-products thereof flow through the vane structure. Heavier particles are thrust outwardly by the vanes and are directed to a trap where they are retained until converted into a gas or until the bag is inflated. However, the gases generated by the burning of the propellant flow to the confinement. In another embodiment, a screen structure is used to prevent molten liquid masses of propellant from entering into the inflatable bag while allowing gases to pass through alternate passageways.

Ochiai discloses a filtering apparatus positioned in the discharge area of a receptacle containing a source of an inflating gas. A cup-shaped barrier, having a convex side which faces the stored gas and a concave side which contains a rupture inducing means, initially contains the gas within the receptacle. When the cup-shaped barrier is ruptured, gas flows through the filter and to the gas bag. However, the broken pieces of the cup-shaped barrier are prevented from entering the gas bag by the filter.

Kasagi et al. discloses positioning a collecting chamber between an inflator and an inflatable safety bag to collect fragments or pieces generated by the removal of the initial isolating structure between the inflator and the inflatable bag. More particularly, the collecting chamber is positioned near a bent portion (illustrated as a 90° bend) of the conduit connecting the inflator and bag in substantial alignment with the conduit prior to making the bend. Consequently, as the gas and any fragments generated by removal of the isolating barrier approach the collecting chamber, the inertial forces possessed by the heavier fragments direct them to continue into the aligned collecting chamber where they are trapped while the gases flow around the bend in the conduit and are directed to the inflatable bag. Various other embodiments address structural modifications of the collecting chamber and/or the conduit, as well as the positioning of certain collecting materials within the collecting chamber.

The above-described filtering-type devices for controlling flow from the inflator to the confinement suffer from a number of deficiencies. For instance, filtering or collecting devices may not retain all of the particles generated upon activation of the inflator. Consequently, some particles may pass through the filtering device and become lodged in a passageway to restrict the flow to the confinement or some may enter the confinement, both of which may adversely affect performance of the inflatable safety system. Even if the filtering device properly functions and retains all of the generated particles, this may in and of itself introduce a further flow restriction to the confinement by blocking an entire passageway or a portion thereof. Furthermore, these filtering-type devices also add to the material and subsequent maintenance costs of the inflator.

As a result of the above deficiencies with systems which address controlling flow by concentrating on the by-products generated by the removal of the isolation between the inflator and the confinement, recent efforts have begun to utilize methods of initiating inflation which reduce the quantity of activation by-products. One possible alternative is the use of a projectile to "remove" the isolating member.

Representative of punching-type projectiles include U.S. Pat. Nos. 3,788,667 to Vancil, issued Jan. 29, 1974, and 3,869,143 to Merrell, issued Mar. 4, 1975, which generally disclose the use of a ramming, piston-like member to remove a barrier isolating the inflator from the confinement after an appropriate signal is received by the respective activating apparatus. These barriers have grooves formed thereon to provide predetermined break lines such that when the ramming member impacts the barrier, the barrier is completely removed from its supporting structure to initiate inflation.

French Patent No. 2,557,251, issued Jun. 28, 1985, discloses releasing a fluid under pressure by using a projectile. More particularly, a plurality of metal particles (i.e., lead shot) are directed toward and "burst" a cup-shaped diaphragm to release the pressurized fluid. Not only does there not appear to be a mechanism for trapping the lead shot after having been fired (i.e., the lead shot may restrict flow by collecting in a passageway and/or may enter the confinement to which the source is connected), but it does not appear that the referenced "bursting" of the disk in the disclosure would indicate any desire to reduce the amount of by-products generated upon activation.

U.S. Pat. No. 3,836,170 to Grosch et al., issued Sep. 17, 1974, generally discloses a variety of projectiles for initiating inflation. In one embodiment, a piston-like ramming member is used to remove the isolating barrier which has rupture lines placed thereon and is therefore similar to that disclosed by Vancil and Merrell discussed above. In another embodiment, a cylindrically-shaped projectile positioned in a tubular guide is directed toward the isolating barrier by the activation of a pyrotechnic charge. A trap positioned beyond the barrier collects the projectile, the by-products of the activation of the pyrotechnic charge, and presumably portions of the isolating barrier, all of which allegedly do not impede the flow of gas through the plurality of exiting passageways. Another embodiment utilizes a blunt nosed projectile (i.e., one which tapers to a degree but not to a point) and an isolating barrier which appears from the drawings to be dished out on the downstream side of the projectile which is exposed to a portion of the source of compressed gas. When the blunt-nosed projectile impacts the dished out barrier on its substantially planar side, the barrier is allegedly torn in a star-shaped manner and the projectile and other by-products of activation are caught in a trap so that the flow of gas is not impeded. Although the blunt-nosed projectile embodiment is alleged to produce a star-shaped tear in the isolating barrier, this particular design would not produce a consistent tear-pattern on the barrier. Initially, it would appear that a portion of the barrier, coinciding essentially with the area of the blunt-nosed face of the projectile, would be "punched out" by the impact of the projectile and become completely separated from other portions of the barrier. However, assuming no punched out portion is produced, the potential for portions of the barrier breaking off and entering the flow still exists. Although there is no explicit disclosure as to the type of surface forming the tapered portion of the projectile, it appears from the drawings that this surface is smooth. Consequently, this surface would not cut or otherwise separate the barrier in a predetermined manner as it passed therethrough, but instead the barrier would tear along lines dictated, in part, by the stresses in the barrier.

As a general rule of manufacturing processes, the thickness of a piece of metal stock determines, in part, the radius of a bend which may be formed without cracking or shearing the stock in the region of the bend. When the radius of a bend in a piece of stock becomes less than the initial thickness thereof, the potential for the development of cracks in the bend or the shearing of the stock in this region increases. Consequently, when it is desirable to achieve a cutting action in this region, the stock may be "bent" at a radius which is less than the thickness thereof, and preferably at a radius which is significantly less than the thickness to ensure shearing or cutting takes place in this region.

Assuming that the blunt-nosed projectile configuration of Grosch et al. would not completely punch out any portion of the isolating barrier, the smooth surface over the tapered portion of the projectile would, based upon the foregoing, bend versus cut the barrier as it passed therethrough since there is no disclosed "edge" which would cause a controlled cut or shear (i.e., the radius of the tapered surface is not, from the drawings, less than the thickness of the isolating barrier). The resultant bending of the barrier by the penetrating projectile would therefore cause the barrier to "tear" along lines dependent upon, in part, the existing stresses in the barrier. Therefore, the separation of the barrier by the blunt-nosed projectile configuration of Grosch et al. is not controlled (i.e., the pattern for the tearing will typically vary dependent upon various factors), thereby creating the potential for separating the barrier in a manner which would result in portions thereof breaking off and entering the flow.

French Patent Nos. 1,147,005, issued Nov. 18, 1957, and 2,543,658, issued Oct. 5, 1984, each generally disclose a projectile for releasing a pressurized fluid from a container. The disclosed projectiles taper to a point and appear to be continuously smooth over the entire tapered surface. The apparent smoothness of the tapered portions of the projectile would also produce inconsistent and uncontrolled results in "removing" or separating a barrier as discussed above due to the resultant bending of the barrier (based upon the radius of the tapered portion) and subsequent uncontrolled "tearing" of the barrier along lines dependent, in part, upon the stresses therewithin. In fact, French Patent No. 2,543,658 discloses that the projectile utilized therein actually "shatters" the isolation which would generate and introduce numerous particles into the system, and thus does not even recognize the desirability of controlling the amount of by-products generated by separation of the barrier.

Canadian Patent No. 967,192, issued May 6, 1975, discloses another projectile head design for releasing a compressed gas. A spring loaded plunger extends through a bottle of compressed gas. When a collision is sensed, the plunger is driven through the diaphragm which isolates the compressed gas from the inflatable member to release the gas. The end of the plunger appears to have a series of unjoined (i.e., non-intersecting), inclined planar surfaces which, although tapered, do not appear to taper to a point. The resultant projectile is thus of the blunt-nosed configuration utilized by Grosch et al. which suffers from the above-noted deficiencies. Moreover, it is not apparent from the drawings and the disclosure does not appear to indicate that this projectile head configuration would cut an isolating member in a consistent manner to reduce fragmentation. Since the inclined faces of the projectile do not intersect, the edges formed by the inclined faces would bend versus cut the barrier, due to the radius of the edge in relation to the diaphragm, resulting in the type of inconsistent and uncontrolled "tearing" of the diaphragm as addressed above.

Related to controlling the flow provided to the confinement is the source of the flow. Some inflatable safety systems utilize only a single type of source. For instance, Ekstrom and U.S. Pat. No. 3,966,228 to Neuman, issued Jun. 29, 1976, both disclose utilizing only a gas stored under pressure to expand the confinement, whereas U.S. Pat. No. 4,380,346 to Davis et al., issued Apr. 19, 1983, discloses utilizing gases generated by the combustion of a propellant as the sole source.

A large number of other types of inflatable safety systems use two types of sources, typically a compressed gas which is stored at ambient temperature (i.e., a cold gas) and gases generated by combustion of a propellant (i.e., a hot gas). For instance, U.S. Pat. No. 4,050,483 to Bishop, issued Sep. 27, 1977, utilizes two time delayed electrical signals, one to remove an isolation between the compressed gas and the confinement and a second to ignite the propellant after the predetermined delay. U.S. Pat. No. 3,731,843 to Anderson, Jr., issued May 8, 1973, and U.S. Pat. No. 3,948,540 to Meacham, issued Apr. 6, 1976 (FIG. 8 embodiment), each generally disclose removing an isolation between the compressed gas and the confinement to initiate the flow and utilizing a pressure differential which develops after this initial release of the compressed gas to, effectively, propel a firing pin, against the force of a biasing spring, into engagement with a percussion cap to ignite a propellant.

U.S. Pat. No. 5,060,974 to Hamilton et al., issued Oct. 24, 1991, discloses releasing a stored gas by removal of an isolation and thereafter activating a gas generator. More particularly, a diaphragm having a firing pin attached thereto inverts to strike a percussion primer and ignite a propellant within the gas generator upon the diaphragm experiencing a certain pressure differential. In this regard one side of the diaphragm is subjected to a reference pressure while the opposite side of the diaphragm, having the firing pin attached thereto and thus facing the percussion primer, is fluidly connected to the container having the stored gas therein by a plurality of outlets. Consequently, when stored gas on the firing pin side of the diaphragm begins flowing through the outlets after the removal of the isolation, a pressure differential develops which inverts the diaphragm in the required manner.

Another alternative for a two source system is generally disclosed by Vancil, Merrell, Meacham (FIG. 1 embodiment), U.S. Pat. No. 3,773,353 to Trowbridge et al., issued Nov. 20, 1973, U.S. Pat. No. 3,895,821 to Schotthoefer et al., issued Jul. 22, 1975, and U.S. Pat. No. 4,018,457 to Marlow, issued Apr. 19, 1977. Each generally discloses activating an inflator through ignition of a propellant upon receipt of an appropriate electrical signal. The gases generated by the combustion of the propellant are then used, directly or indirectly, to remove an isolation between the confinement and the compressed gas to thereby release both the compressed gases and the propellant gases to the confinement.

SUMMARY OF THE INVENTION

One embodiment of the present invention generally relates to releasing gases or other fluids in a manner which does not result in any significant amount of foreign materials entering the flow from the source of such gases or fluids. In this regard, the present invention includes a housing having a source of gas or other appropriate fluid, a barrier to initially contain the gas within the housing, and a projectile positioned on one side of the barrier. When release of the gas is desired, the projectile is propelled toward the barrier to penetrate, pass through, and separate the barrier in a controlled manner which creates a path for the flow of gas from the housing. Due to the controlled separation of the barrier, the barrier remains substantially intact after being penetrated by the projectile which reduces the potential for the generation of fragments or other foreign materials. Consequently, the potential for a restricted flow due to collection of debris in passageways connecting the source of gas and the article to receive the gas, as well as the potential for such debris actually entering the article, is significantly reduced. Therefore, this embodiment of the present invention which utilizes a single function projectile is particularly useful in inflatable safety systems for motor vehicles.

The configuration of the single function projectile contributes to the performance of this embodiment of the present invention, namely by controlling the separation of the barrier. One embodiment of this projectile utilizes a plurality of inclined, intersecting faces which converge to substantially a point at the tip of the projectile. The pointed tip of the projectile effectively penetrates the barrier and the intersection of the adjacent faces produces a plurality of edges which, as the projectile passes through the barrier, cut the barrier along lines defined by these edges. In order to further enhance the definition of these edges to obtain a more effective cutting action, which further improves the controlled separation of the barrier, the faces of the projectile in another embodiment are concavely-shaped to effectively "raise" the edges to a sharper degree.

The effective result of the above-described configuration of the single function projectile is that the barrier is separated into a number of substantially triangularly-shaped petals coinciding with the number of faces and edges possessed by the projectile. These individual petals each remain attached to the perimeter of the barrier and point in the direction of the flow. Consequently, the barrier is separated in a controlled manner by the described cutting action of the projectile to produce an end configuration for the barrier which reduces the potential for portions thereof breaking off and entering the flow.

The configuration of the barrier itself also contributes to the performance of this single function projectile embodiment of the present invention. In one embodiment, the barrier is a dome-shaped disk having a concave and convex side. Preferably, the concave side is exposed to the pressurized gas which is therefore exerting forces thereon, while the convex side faces the projectile. This configuration is advantageous in that when the projectile initially contacts the convex portion of the disk in its central region, the disk is dimpled which increase the stresses in the disk. Consequently, as the projectile penetrates the disk and the above-defined edges of the projectile initiate the separation lines thereon by the described cutting action, the disk stresses introduced by the dimpling, as well as the forces exerted on the concave side of the disk by the pressurized gas, assist in the separation of the disk along lines defined by the edges of the projectile.

Based upon the foregoing, it can be appreciated that the single function projectile embodiment of the present invention is particularly useful with inflatable safety systems for motor vehicles which generally consist of some type of inflator and an expandable confinement. In this regard, the projectile is suitably attached to a squib or other similar electroexplosive device which is commonly connected to a collision, impact, or deceleration detector. When an appropriate signal is received by the squib, the projectile is propelled through the barrier to yield the above-described results. Thereafter, the inflator supplies the gas or another fluid to the confinement by a variety of methods. The flow of gas thus provided to the confinement is essentially free from debris which could potentially adversely affect the performance of the inflatable safety system.

The single function projectile embodiment of the present invention offers a number of advantages not previously provided for by known gas release mechanisms for inflatable safety systems. For instance, this embodiment concentrates on reducing the materials generated in releasing the gas. Consequently, the need for additional and sometimes complex connectors between the inflator and the confinement is eliminated. Relatedly, the need for additional components such as filters, which may not effectively remove all particles and which may also become plugged to further adversely affect the performance of the inflator, is also eliminated. By choosing an appropriate number of inclined faces and thus cutting edges for the projectile, this embodiment consistently releases a gas without generating an amount of fragments which could adversely affect the performance of the inflator and/or the inflatable confinement.

Another embodiment of the present invention generally relates to releasing a compressed gas and igniting a propellant by using a dual function projectile. In this regard, the present invention includes a housing having a source of gas or other appropriate fluid, a gas generator interconnected with this housing which contains a propellant, and a projectile. When release of the gas is desired, the projectile is propelled through a sealing portion of the housing t create a flow path from the housing. The projectile then impacts an activating portion of the gas generator to ignite the propellant. Consequently, the projectile performs two functions, thereby reducing the required number of components as well as the complexity of their interaction for an inflator which utilizes a two source system (i.e., stored gases and propellant gases).

The sealing portion of the housing retains the stored gas until the projectile is activated. In one embodiment, this sealing portion of the housing is a closure disk which is substantially aligned with the projectile. Although various configurations of closure disks and projectiles may be used in this dual function projectile embodiment, preferably the above-discussed dome-shaped disk is used in combination with a projectile having the same configuration as the single function projectile discussed above so as to also provide the desirable fragmentation reduction feature.

After the projectile passes through the sealing portion of the housing, the projectile impacts an activating portion of the gas generator. In one embodiment, this activating portion includes an activation plate which is substantially aligned with the projectile. When the projectile impacts the activation plate, it is deflected such that an impacting member, such as, for instance, a ring or a plurality of extensions, attached to the activation plate is driven toward and into contact with at least one of a plurality of percussion primers positioned near an ignition charge within the gas generator. Consequently, the ignition charge and then the propellant are ignited to generate a source of propellant gases having an elevated temperature over that of the stored gas.

Although this dual function projectile embodiment reduces the number of required components and the complexity of their interaction for a two source inflator, the performance of the present invention is not significantly adversely affected. For instance, it is desirable in motor vehicle inflatable safety systems to provide an initial flow of gas at ambient temperature to the confinement before providing a supply of gas at an elevated temperature. This embodiment of the present invention provides this desirable feature. For instance, in one embodiment an outlet is provided on the gas generator to direct the flow of propellant gases away from the flow path created through the sealing portion by the projectile. Moreover, in another embodiment the gas generator outlet is positioned a certain distance from the sealing portion of the housing (i.e., a column of stored gas is between the sealing portion of the housing and the gas generator outlet). Furthermore, in another embodiment the gas generator operates at a pressure which is not significantly greater than that within the housing. The result is that little turbulence is generated such that mixing of the propellant gases and stored gases is minimized. Consequently, the propellant gases effectively function as a piston to force the above-described column of ambient temperature stored gas to the confinement before a significant portion of the elevated temperature propellant gases are provided thereto.

Many of the advantages of this embodiment of the present invention are attributable to the dual function projectile. In one embodiment, the projectile has a cavity portion in which at least a portion of a squib may be positioned. Consequently, this assembly may be conveniently positioned externally of the housing and its source of stored gas. Moreover, by incorporating a cavity on the projectile and this positioning of a portion of the squib therein, the squib is able to direct sufficient forces thereon when activated to sufficiently guide the projectile through the sealing portion of the housing and into contact with the activating portion of the gas generator. In order to further improve the guidance of the projectile, the squib and the projectile may be positioned within a sleeve in another embodiment. The length of the sleeve may be such that the entire projectile will never leave the sleeve. Consequently, after the projectile performs its dual functions, the projectile is retained within the sleeve. The retention of the projectile within the sleeve also reduces the potential for those by-products, from the activation of the squib which could adversely affect performance, entering the flow.

Although the actual configuration of the projectile is not generally critical to the performance of both functions, preferably the above-described single function projectile having the plurality of cutting edges is used to also provide the desired fragmentation reduction feature. While other types of configurations may be used for the dual function projectile, such as a ball, it may be necessary or at least desirable to incorporate an appropriate filtering system to reduce the potential for fragments being provided to the confinement.

Another embodiment of the present invention is a gas generator ignition assembly for an inflator in a motor vehicle inflatable safety system. The ignition assembly includes an actuation piston and an activator which are initially separated by a retention device which engages the actuation piston. When a certain magnitude of force is applied to the actuation piston, preferably coinciding with a condition in which operation of the inflatable safety system is desirable, the retention device substantially releases the actuation piston such that the actuation piston moves into engagement with the activator to ignite the propellant contained within the gas generator.

A number of features may be incorporated into the above-described embodiment of the ignition assembly to enhance the performance of the inflator associated therewith. For instance, in one embodiment an actuation support structure is positioned to engage the gas generator housing and to retain at least a portion of and guide the actuation piston toward the activator. In this regard, the actuation piston may be slidably engaged with the actuation support structure and have at least one projecting member for engaging with a portion of the activator, for instance a percussion primer(s) substantially aligned with such projecting member(s). Moreover, a retention pin or ring, seated within the actuation support structure, may engage the actuation piston and initially maintain its position away from the percussion primer(s) to reduce the potential for preignition of the propellant. However, when an appropriate force is exerted on the actuation piston, the retention pin or ring shears such that the projecting member(s) of the actuation piston impact the substantially aligned percussion primer(s) to ignite the propellant. In order to reduce resistance to this movement of the actuation piston, due for instance to compression of any gases between the actuation piston and the activator, orifices may be appropriately incorporated on the actuation support structure to provide a release conduit for any such gases. Moreover, since there may be leakage of propellant gases through the primer(s) once discharged, advantageously such propellant gases force the actuation piston away from the primer(s) such that a shoulder portion on the actuation piston engages a shoulder portion on the actuation support structure to act as a check valve and effectively seal the gas generator housing in this region. As a result, the propellant gases are properly directed through the gas generator outlet(s) to improve the consistency of performance of the inflator.

As can be appreciated, the ignition assembly of the present invention may be utilized by a variety of inflator designs, including those which use a projectile to activate the gas generator such as the above-described dual function projectile embodiment of the present invention. In this regard, when the dual function projectile is propelled toward and impacts the substantially aligned actuation piston, the force of impact causes the retention device to release the actuation piston such that the actuation piston moves into engagement with the activator to ignite the propellant. Advantageously, the actuation piston is able to withstand the ballistic pressures experienced thereby due to the impact of the projectile. Thereafter, the propellant gases, as well as the stored gases released by the dual function projectile, are thereby provided to the inflatable safety system in the above-described manner.

DETAILED DESCRIPTION OF THE INVENTION

The present invention will be described with reference to the accompanying drawings which illustrate the pertinent features thereof. One embodiment of the present invention is an apparatus which releases gases or other fluids from a container without introducing any significant amount of fragments or other debris into the flow from the container through use of a single function projectile. Although this embodiment may be used in all applications where it is desirable to release any source of gas or other fluid, the fragmentation reduction feature makes it particularly useful in motor vehicle inflatable safety systems.

Figure 1:
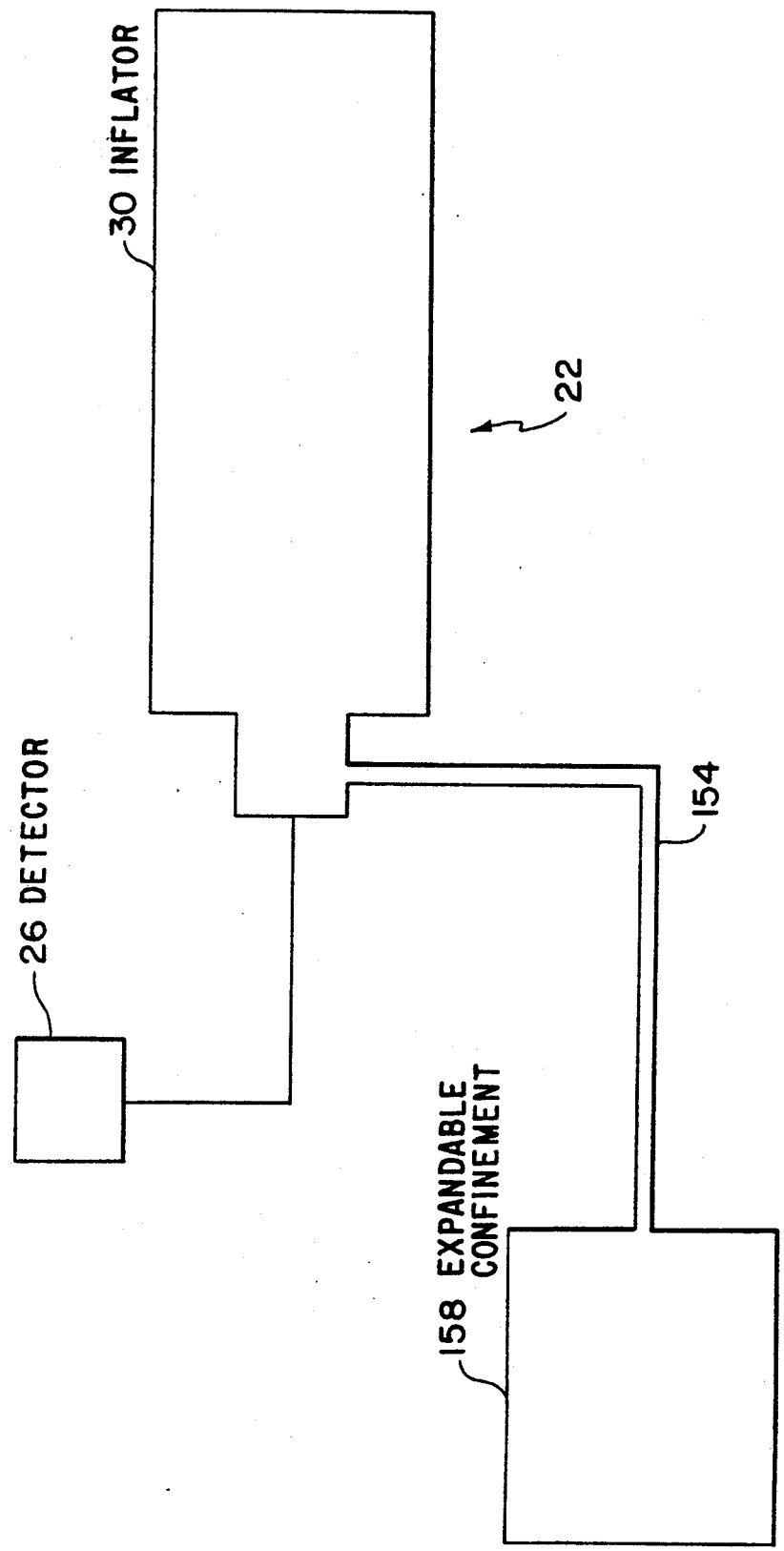
FIG. 1 is a block diagram of a typical inflatable safety system for motor vehicles.

Referring to FIG. 1, a typical inflatable safety system 22 is generally illustrated. The primary components of such an inflatable safety system 22 include a detector 26, an inflator 30, and an expandable confinement 158. When the detector 26 senses a condition requiring expansion of the confinement 158, a signal is sent to the inflator 30 to release gases or other suitable fluids from the inflator 30 to the confinement 158 via the conduit 154. Although one particular type of inflator 30 will be described herein with reference to this single function projectile embodiment, it will be appreciated that it may be used with a wide variety of inflators 30, including those which only contain a source of pressurized gas or other fluid, those which utilize a source of pressurized gas in combination with a propellant which is ignited at some point during inflation to augment the flow, or those systems which utilize only the ignition and subsequent combustion of a propellant to expand the confinement 158.

Figure 2:
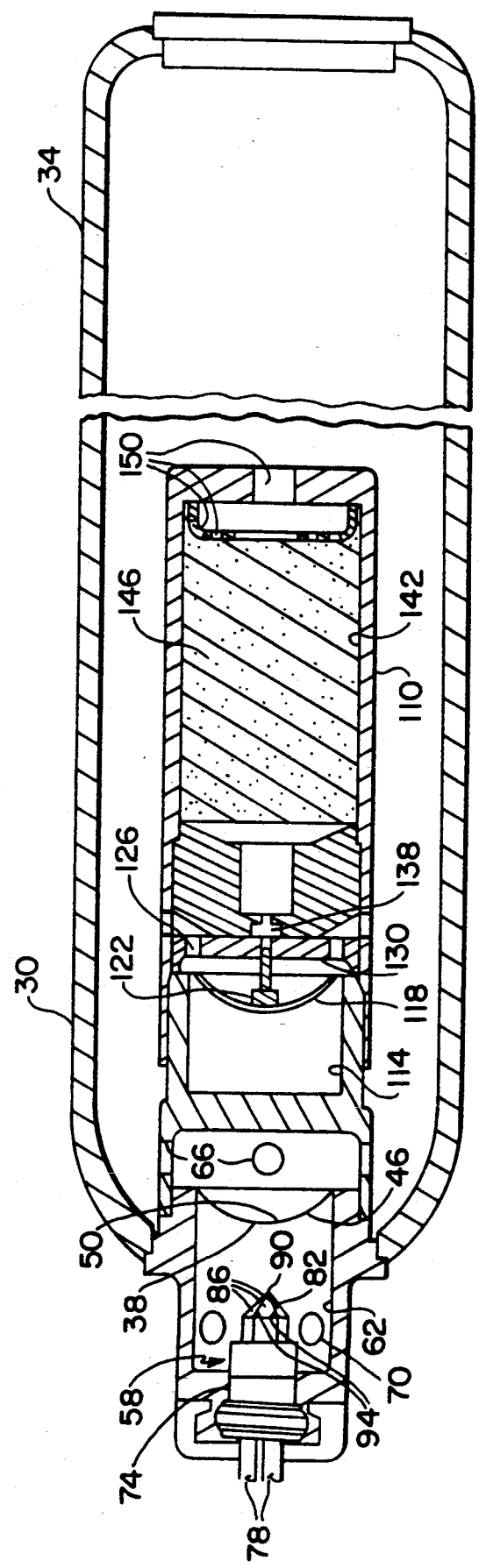
FIG. 2 is a longitudinal cross-sectional view of one type of inflator with which the single function projectile embodiment of the present invention may be used.

One inflator 30 with which the single function projectile embodiment of the present invention may be used is illustrated in FIG. 2. Generally, the inflator 30 includes a stored gas housing 34 which contains a source of pressurized gas, a pressurized, dome-shaped isolating disk 38 which contains the gas within the stored gas housing 34 until a condition requiring inflation is sensed by the detector 26 (FIG. 1), an activator assembly 58 which effects the release of the gas from the stored gas housing 34 by separating the disk 38 in a controlled manner (discussed in detail below) to initiate flow to the confinement 158 (FIG. 1), and a gas generator 110 which augments the flow to the confinement 158 (FIG. 1) after the initial expansion thereof by ignition and subsequent combustion of a propellant 146 contained therein.

In operation of the inflator 30 of FIG. 2, the detector 26 (FIG. 1), will sense a condition requiring operation of the inflatable safety system 22 and thereafter sends a signal through the leads 78 to the activation assembly 58 which is positioned in close proximity to the disk 38. The activation assembly 58 includes an electroexplosive device 74 having a projectile 82 appropriately attached thereto. Upon receipt of this signal, the electroexplosive device 74 propels the projectile 82 toward the disk 38 to penetrate and separate the disk 38 in a controlled manner (discussed below) to allow gas to begin flowing from the stored gas housing 34, through the interior discharge ports 66, the discharge connector 62, the exterior discharge ports 70, the conduit 154, and into the confinement 158. Due to the effective diameter of the projectile 82, it is unable to pass through the exterior discharge ports 70 and is thus retained within the inflator 30 during inflation.

A gas generator 110 is coaxially positioned within the stored gas housing 34 to augment the flow to the confinement 158 after having been initially expanded by the flow of pressurized gas from the stored gas housing 34. This augmented flow is initiated in response to certain changing conditions, one of which is a change in pressure, and thus the inflator 30 utilizes a reference chamber 114 having a pressurized gas contained therein by a cup-shaped, bistable diaphragm 118 which assists in activating a propellant 146 contained within a propellant chamber 142.

In its first position, the convex surface of the diaphragm 118 is exposed to the gas within the reference chamber 114 while its concave surface is exposed to the gas within the stored gas housing 34 via the plurality of pressure ports 126 positioned in the wall of the gas generator 110 and the divider 130 positioned between the diaphragm 118 and the propellant chamber 142. Consequently, as gas flows from the stored gas housing 34 to the confinement 158 after the above-described controlled separation of the disk 38 by the projectile 82, the pressure on the initial concave surface of the diaphragm 118 decreases in relation to the pressure within the reference chamber 114 which continues to exert forces on the convex surface of the diaphragm 118. After a certain differential pressure develops, the diaphragm 118 rapidly inverts into its second position (i.e., the convex surface now faces the propellant chamber 142) to propel an impacting mass 122 into engagement with a percussion primer 138 to ignite the propellant 146. The propellant gases generated by the combustion of the propellant 146 then exit the propellant chamber 142 through the gas generator ports 150 to augment the flow to the confinement 158 through the above described passageways.

An important aspect of this single function projectile embodiment of the present invention is the controlled separation of the disk 38 in a manner which not only allows for a sufficient, timely flow from the inflator 30 to the confinement 158 (FIG. 1), but which allows the disk 38 to remain substantially intact to significantly reduce the amount of foreign materials which are generated upon activation of the inflator 30. The configuration of the projectile 82 contributes to this controlled separation of the disk 38 and embodiments of the projectile 82 are illustrated in FIGS. 3–8. Although the disk 38 is illustrated as being dome-shaped in FIGS. 2, 9–10, and 15, the advantages of which will be discussed below, other configurations may be appropriately separated by the projectile 82 in the desired controlled manner.

Figure 3:
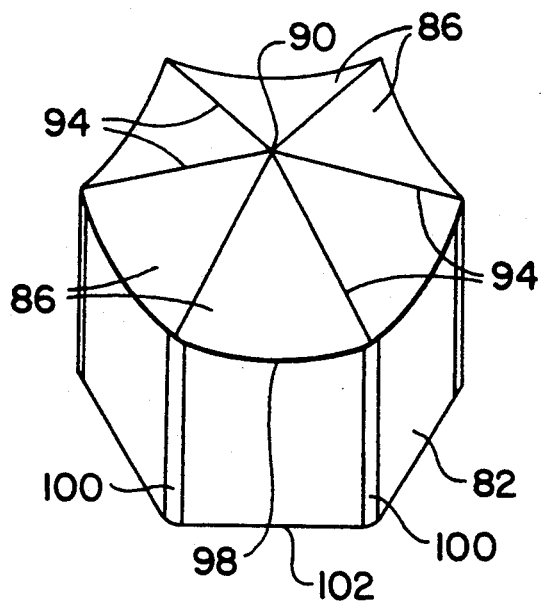
FIG. 3 is a perspective view of one embodiment of a projectile.
Figure 4:
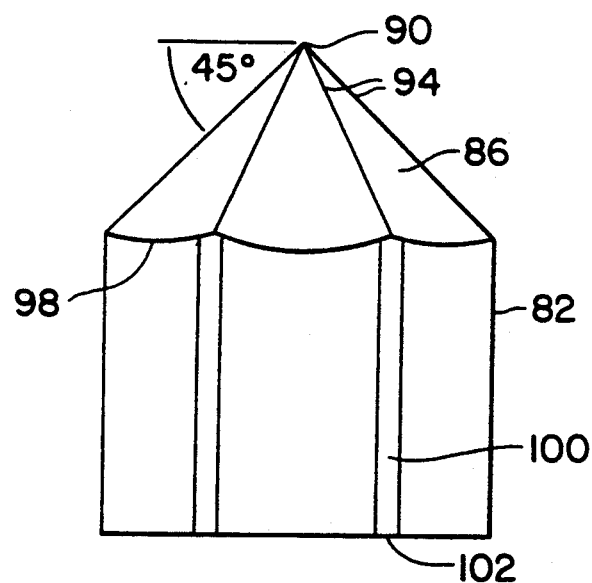
FIG. 4 is a side view of the projectile of FIG. 3.
Figure 5:
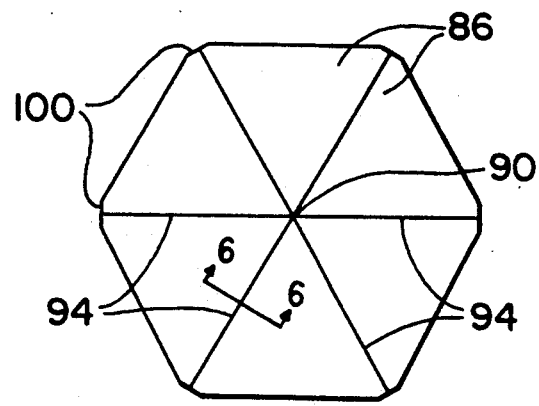
FIG. 5 is a top view of the projectile of FIG. 3.
Figure 6:
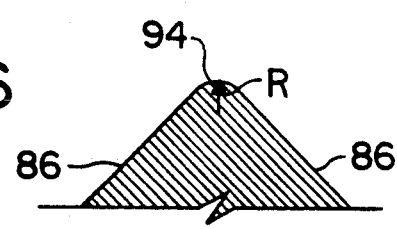
FIG. 6 is a partial cross-sectional view of one embodiment of the projectile of FIG. 5 taken along line 6—6.
Figure 11:
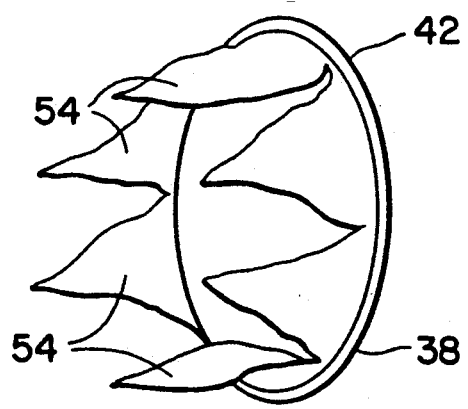
FIG. 11 is a perspective view of the isolating disk of FIG. 9 after one embodiment of the single function projectile has passed therethrough.
Figure 12:
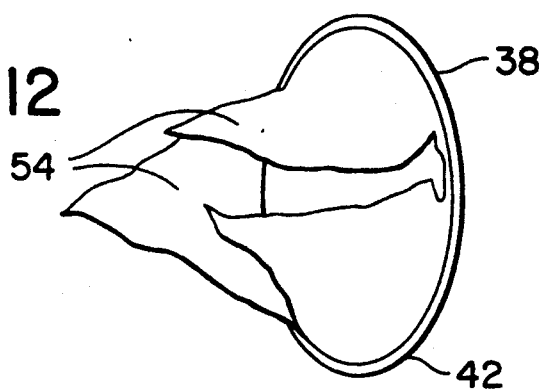
FIG. 12 is a perspective view of the isolating disk of FIG. 9 after another embodiment of the single function projectile has passed therethrough.
Figure 15:
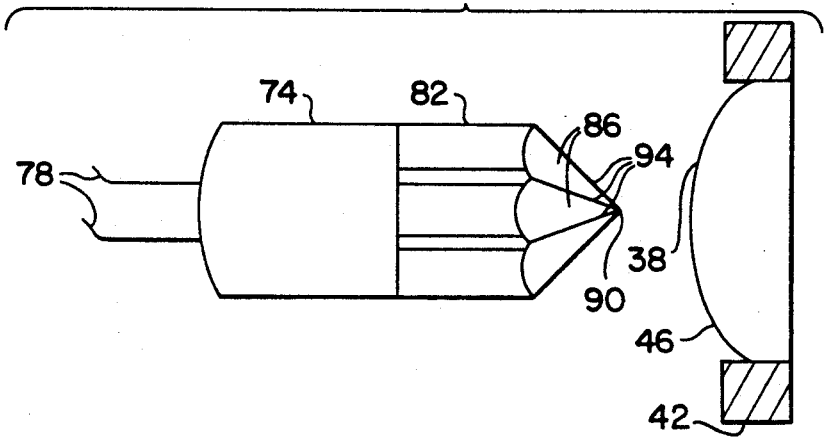
FIG. 15 is a side view of one embodiment of a single function projectile prior to being propelled toward the isolating disk of FIG. 9.

Specifically referring to FIGS. 3–5, the projectile 82 includes a plurality of inclined, intersecting faces 86 which converge to a point at the tip 90 of the projectile 82. The intersection of these faces 86 thereby define a plurality of edges 94 which are used to initiate separation of the disk 38 along lines coinciding with the edges 94. As will be discussed in more detail below, preferably each face 86 is of substantially the same size and configuration, resulting in the edges 94 being substantially equally spaced to separate the disk 38 into substantially equally-sized petals 54, each of which remain attached to a rim 42 positioned on the perimeter of the disk 38 and which point in the direction of the flow as illustrated in FIGS. 11–12 and 15.

The pointed tip 90 allows the projectile 82 to effectively penetrate the disk 38 without removing any significant material portions thereof (i.e., no significant portion of the disk 38 is punched out and separated from remaining portions of the disk 38 by the penetrating projectile 82). As the projectile 82 advances through the disk 38, the edges 94 cut the disk 38 along lines coinciding with the edges 94. This cutting action is achievable since the projectile 82 tapers outwardly from its tip 90 to the base 98 (i.e., the effective diameter of the projectile 82 increases from the tip 90 to the base 98). Moreover, each edge 94 possesses a sufficient "sharpness" to cut or shear the pressurized disk 38 along lines coinciding with the edges 94. This is a primary requirement in achieving controlled separation of the disk 38 to produce a consistent end configuration thereof which will remain substantially intact throughout operation of the inflator 30 so as to not adversely affect the performance thereof by introducing fragments or other foreign materials into the flow. The cutting or shearing of the disk 38 is greatly enhanced by the high stress level in the disk 38 due to pressure of the gas on the concave side 50 of the disk 38.

As a general rule of manufacturing process, the thickness of a piece of metal stock determines, in part, the radius of a bend which may be formed without cracking or shearing the stock. When the radius of a bend for a piece of metal stock becomes much smaller than the initial thickness of the stock, the potential for the development of cracks in the bend or the actual shearing of the stock in this region increases. Consequently, if it is desirable to achieve a cutting or shearing action in this region, the stock should be bent at a radius which is much less than its thickness. The thickness of a typical disk 38 used by inflators 30 of the type described herein is approximately 0.010 inch. Therefore, based upon the foregoing general rule, the radius "R" defined by the intersection of the faces 86 of the projectile 82 which defines ad edge 94, best illustrated in FIG. 6, should be less than 0.010 inch in order to achieve the desired cutting action. However, in order to ensure that the desired cutting or shearing action is achieved in these regions, the radius R should be significantly less than the thickness of the disk 38, and in this case the radius R should thus preferably be less than 0.002 inch.

Figure 7:
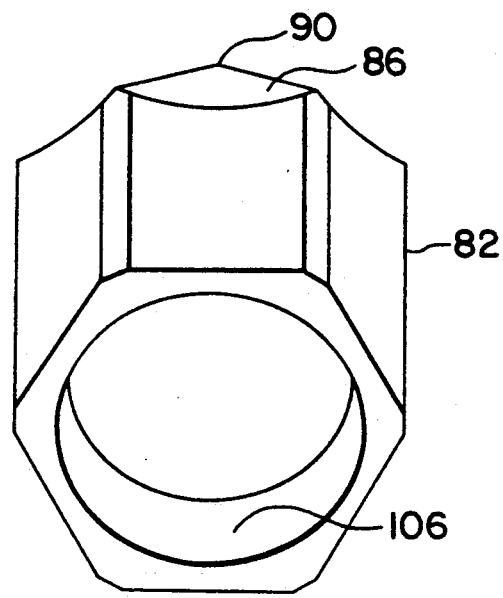
FIG. 7 is a second perspective view of the projectile of FIG. 3 from the bottom portion thereof.

In order to enhance the definition of the edges 94 on the projectile 82, the faces 86 may have a certain degree of concavity as best illustrated in FIGS. 3, 4, and 7, although such concavity is not necessarily required (i.e., the edges 94 may already have a sufficiently small radius to produce the desired cutting action described above). The faces 86 taper downwardly from the edges 94 to produce the desired concavity. Consequently, the edges 94 are in essence "raised" to enhance separation of the disk 38 by producing a more effective cutting action. As can be appreciated, although a certain increased definition of the edges 94 will enhance the controlled separation of the disk 38 along the predetermined lines defined thereby, the point may be reached where such definition will undesirably increase the potential or portions thereof to break off from the remainder of the projectile 82 when passing through the disk 38.

Figure 13:
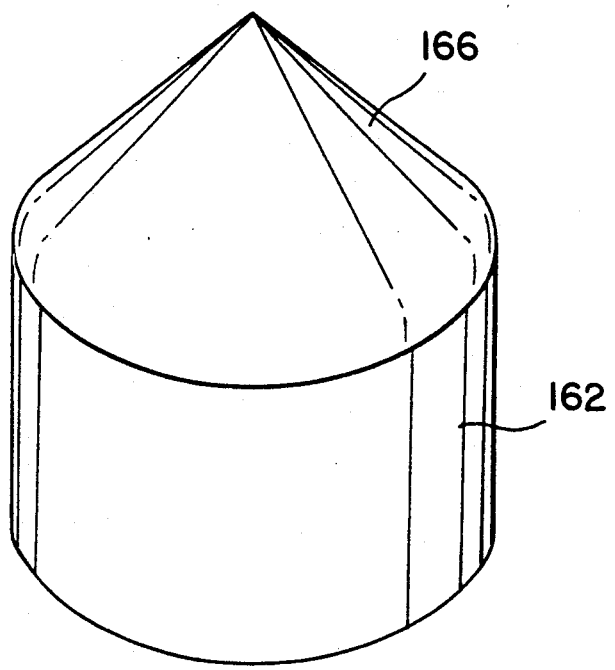
FIG. 13 is a perspective view of a projectile having a pointed tip and a smooth surface over the taper forming the tip.
Figure 17:
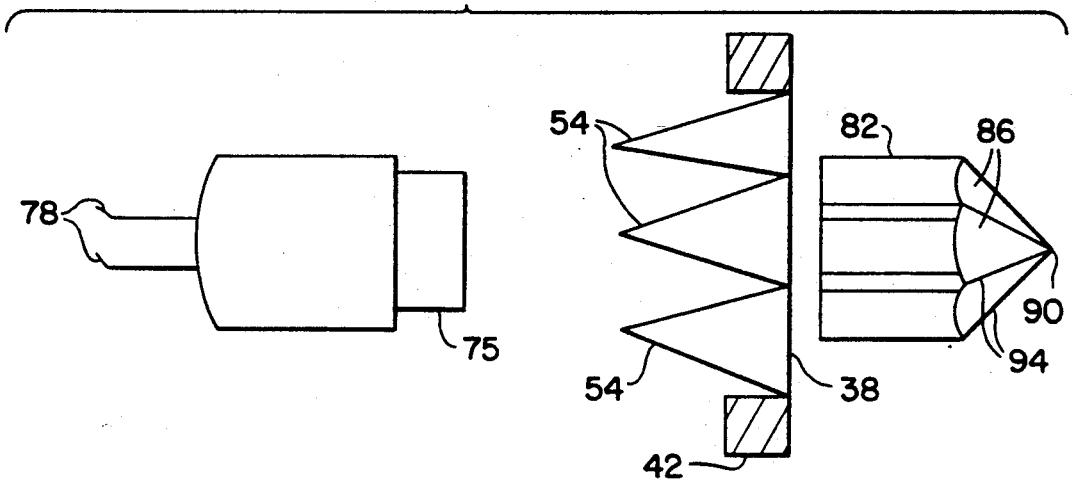
FIG. 17 is a side view of one embodiment of the single function projectile after it has completely penetrated and passed through the isolating disk of FIG. 9.

For purposes of comparison with the projectile 82 of FIGS. 3–8 and its configuration which allows for controlled separation of the disk 38 by the cutting or shearing thereof along predetermined lines, consider the conical projectile 162 of the type illustrated in FIG. 13 which is unable to consistently produce an end configuration of a disk 38 similar to that illustrated in FIGS. 11–12 and 17. The radius of the smooth, tapered surface 166 of the conical projectile 162 does not approach that which will induce shearing of the disk 38 in the region of the bend based upon the above-discussed principles of bending (i.e., the radius of the tapered surface is not sufficiently small to shear the disk 38 along predetermined lines). As the conical projectile 162 passes through the disk 38, the bending thereof will cause the disk 38 to tear along lines which coincide, in part, with the stresses within the disk 38, which may vary from case to case dependent upon a number of factors. An expected typical end configuration of a disk 38 using the conical projectile 162 is thus illustrated in FIG. 14. As is evident by the configuration of the disk 38 in FIG. 14, the results are essentially unpredictable and there then exists a potential for portions of the barrier 38 breaking off and entering the flow from the inflator 30.

Although the "sharpness" of each edge 94 of the projectile 82 is important to achieving the desired cutting action to produce a controlled separation of the disk 38, there are other contributing factors. For instance, the degree of the taper of the edges 94, as defined by the angle of inclination of the faces 86, affects the cutting action. In one embodiment, the faces are inclined at an angle of 45° relative to the longitudinal axis of the projectile 82 (or 45° relative to a horizontal plane touching the tip 90 as illustrated in FIG. 4) to provide an effective cutting action. Although the length of the edges 94 is directly affected by this angulation and the effective diameter of the projectile 82, the required length is more a function of the diameter of the disk 38 to be separated (discussed below), but it is nonetheless desirable for the length of each edge 94 to be substantially equal. In addition, the edges 94 of the projectile 82 should completely extend to the base 98 of the projectile 82 and maintain the above-described "sharpness" over the entire length thereof to in effect abruptly end the cut (although it may be continued by other forces as discussed below). Any rounding off of the edges 94 before reaching the base 98 of the projectile 82 will potentially result in an uncontrolled tearing of the disk 38 after the projectile 82 passes therethrough to increase the potential for the breaking off of portions thereof.

The projectile 82 should also be configured from its base 98 to its bottom 102 so as to not interfere with the separation lines produced by the edges 94 (i.e., the base 98 should substantially linearly connect the ends of the edges 94 such that if there are six edges 94, the projectile 82 will be substantially hexagonal). It may also be necessary or desirable to flatten out portions 100 of the projectile 82. Furthermore, the hardness of the projectile 82 and its edges 94 should preferably be quantitatively greater than that of the disk 38 to ensure the desired cutting action is achieved. Since a typical disk 38 is made from Inconel TM 625, one suitable material for the projectile 82 is stainless steel.

When the above-described configuration of the projectile 82 penetrates and passes through a substantially circular disk 38, the cutting action produces an end configuration of a disk 38 which has a number of triangularly-shaped petals 54, which remain attached to the rim 42 of the disk 38, and which coincide with the number of edges 94 and faces 86 of the projectile 82 as illustrated in FIGS. 11-12 and 17. For instance, if the projectile 82 has six similarly sized faces 86, the separated disk 38 will consistently have six similarly sized petals 54 as illustrated in FIG. 11, whereas if the projectile 82 has three similarly sized faces 86, the separated disk 38 will consistently have three similarly sized petals 54 as illustrated in FIG. 12.

The resultant number of petals 54 into which the disk 38 is separated directly affects the desired reduction in potential for portions of the disk 38 breaking off and entering the flow. For instance, as the number of petals 54 decreases, there is naturally a corresponding increase in their individual size. Consequently, the "width" of the base of these petals 54 where they remain attached to the rim 42 of the disk 38 also increases. When this base width of the petals 54 increases to a certain degree, the point may be reached where the material stresses in this region may promote an uncontrolled tearing of the disk 38. As a result, portions of the disk 38, although initially separated in a controlled manner by the projectile 82, may tear or break off because of these stresses and subsequently enter the flow from the inflator 30.

Figure 14:
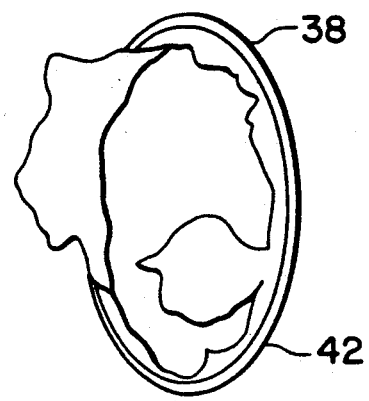
FIG. 14 is a perspective view of the isolating disk of FIG. 9 in an expected configuration after the projectile of FIG. 13 has passed therethrough.

Increasing the number of petals 54 reduces the individual size thereof and thus the "width" of the petals 54 where attached to the rim 42 of the disk 38, which thus also reduces stresses in the disk 38 in these regions. However, as the number of petals 54 is increased, the point may be reached where the base of the petals 54 becomes sufficiently small such that individual petals 54 may break or be torn off by the flow from the inflator 30. Moreover, the point will be reached where the plurality of intersecting faces 86 will approach a smooth surface such as possessed by the conical projectile 162 illustrated in FIG. 13. (i.e., the radius R (FIG. 6) of the edges 94 will increase such that the desired cutting action will not be achievable due to the above-discussed bending principles). Consequently, the disk 38 will tear in a manner dictated not by the cutting action of the edges 94, but primarily by the stresses in the disk 38 generated by the bending action of the projectile 82, thereby increasing the potential for portions thereof to break or tear off and enter the flow. Again, an expected end configuration of a disk 38 after a projectile 82 possessing too many edges 94 which approaches the configuration of the conical projectile 162 of FIG. 13 has passed therethrough is illustrated in FIG. 14.

Based upon the foregoing, in order to achieve the desired cutting action to consistently produce an end configuration of a disk 38 which will not introduce any significant amounts of material into the flow, the number of faces 86 and thus edges 94 for the projectile 82 could range from 4-10, and preferably should range from 5-8. A hexagonal projectile 82 (i.e., six faces 86) has produced particularly desirable results.

Figure 8:
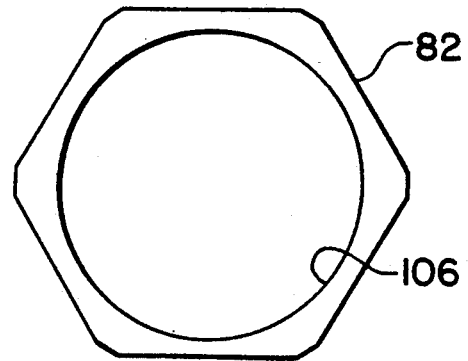
FIG. 8 is a bottom view of the projectile of FIG. 3.
Figure 16:
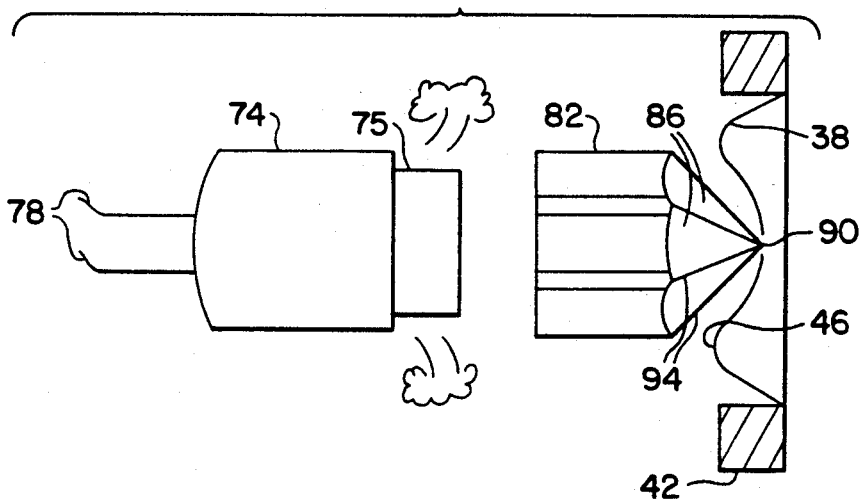
FIG. 16 is a side view of one embodiment of the single function projectile as it initially contacts and pierces the isolating disk of FIG. 9.

The projectile 82 of the described configuration is propelled toward the disk 38 to produce the desired controlled separation thereof. In this regard, the projectile 82 is initially attached to the end of the electroexplosive device 74 as best illustrated in FIGS. 2 and 15. Numerous methods may be used to attach the projectile 82 to the electroexplosive device 74 such as by molding, crimping, or using an adhesive When the detector 26 (FIG. 1) senses a condition requiring expansion of the confinement 158 (FIG. 1), the electroexplosive device 74 (FIGS. 2 and 15) is activated to propel the projectile 82, without the use of an external guide or other similar bore, toward the disk 38 (FIGS. 2 and 16). Since an external guide is not used in the illustrated embodiment of the single function projectile, the projectile 82 may have a cavity 106 positioned on its bottom 102 such that the forces of the electroexplosive device 74 are concentrated thereon as best illustrated in FIGS. 7-8. In order to enhance this desired concentration of forces, an extension 75 of the electroexplosive device 74 which contains, for instance, black powder, may fit within the cavity 106 of the projectile 82 (FIGS. 7-8). Consequently, the need for a separate external guide is eliminated. Instead, the projectile 82 motion is initially guided by the fit of the cavity 106 of the projectile 82 over the extension 75 of the electroexplosive device 74.

Figure 9:
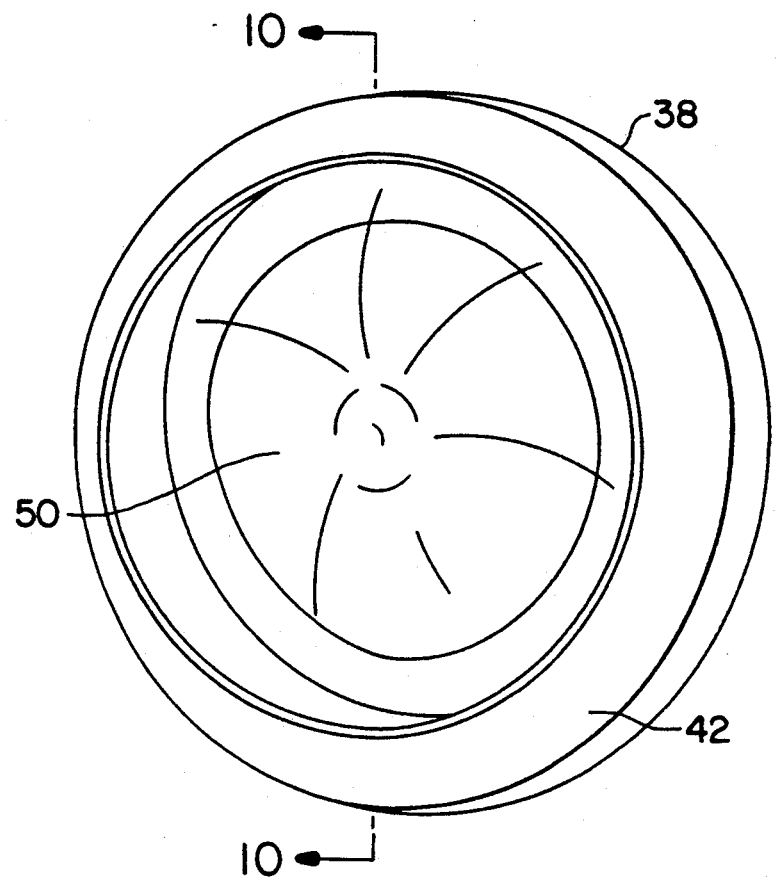
FIG. 9 is a perspective view of a preferred configuration of an isolating disk useful with the present invention.
Figure 10:
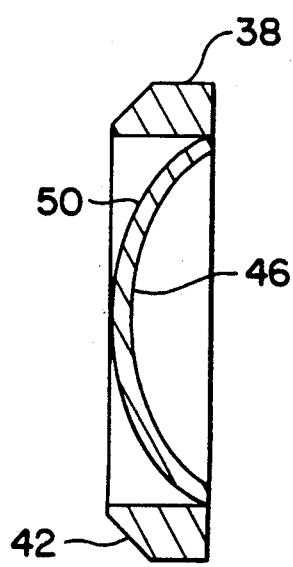
FIG. 10 is a cross-sectional view of the disk of FIG. 9 along line 10—10.

The configuration of the disk 38 also contributes to the controlled separation by the projectile 82. A dome-shaped disk 38 which has a concave side 46 and a convex side 50 may be used to achieve similar results as best illustrated in FIGS. 9-10 and as generally illustrated in FIGS. 2 and 15. Preferably, the concave side 46 is exposed to the gas within the stored gas housing 34 (FIG. 2) while the convex side 50 is positioned to face the projectile 82 (FIG. 2). This particular configuration offers a number of advantages in reducing the number of fragments generated upon release of the gas from the stored gas housing 34 and in permitting the electroexplosive device 74 with its attendant lead wires 76 to be positioned outside the pressurized compartment of the stored gas housing 34.

Referring to FIGS. 15-17, the disk 38 will initially be in a stressed condition due to the exertion of forces on the concave side 46 thereof by the pressurized gas within the stored gas housing 34 (FIG. 2). When the projectile 82 is propelled toward and initially contacts the disk 38, the disk 38 will "dimple" in as illustrated in FIG. 16 and begin to "pierce" the disk 38. This dimpling of the disk 38 further increases the stresses therewithin. When the disk 38 is penetrated by the projectile 82, these stresses are released and assist in the separation of the disk 38 along the lines defined by the edges 94 of the projectile 82 (i.e., the desired cutting action is enhanced). Further contributing to the controlled separation of the disk 38 along these lines is the flow of gas from the stored gas housing 34. Consequently, the end result is a plurality of petals 54 of substantially similar size which point in the direction of the flow which further reduces the potential for portions thereof breaking off and entering the flow from the inflator 30 as illustrated in FIG. 17.

When using a disk 38 of the above described "dome-shaped" configuration, the diameter of the projectile 82 need not necessarily be similar to that of the disk 38 to ensure that controlled separation thereof is achieved. For instance, due to the stresses in the disk 38 resulting from the above-described initial "dimpling" of the disk 38 from the projectile 82 and the forces exerted on the concave side 46 of the disk 38 by the gas from the stored gas housing 34, the edges 94 of the projectile 82 do not have to cut the disk 38 all the way to the rim 42 to achieve full separation. As long as the controlled cut has reached a certain distance, these other forces will complete the separation of the disk 38 in a controlled manner without significantly increasing the risk for portions thereof breaking off. In fact, the diameter of the projectile 82 may be approximately one-half of that of the disk 38 without generating or undesirably increasing the potential for generating any significant amount of fragments.

In operation of the single function projectile embodiment of the present invention when incorporated into an inflatable safety system 22 of the type illustrated in FIGS. 1-2, the detector 26 will send a signal to the electroexplosive device 74 when activation of the inflatable safety system 22 is required. After the electroexplosive device 74 receives the signal, the projectile 82 is propelled through the disk 38 to achieve the above-desired results. When a hexagonally configured projectile 82 has been initially positioned approximately ¼" from the disk 38 and propelled toward the disk 38 at an initial velocity ranging from 500-600 feet/second, desirable results have been obtained. However, as can be appreciated, by varying the weight of the projectile, various ranges of initial velocities may be used. For instance, by increasing the weight of the projectile 82 this initial velocity can be reduced to 300-500 feet/second.

After the projectile 82 passes through the disk 38, gas will flow from the stored gas housing 34 into the confinement 158 without any significant amount of foreign materials therein which could adversely affect performance of the inflatable safety system 22. Since the diameter of the projectile 82 is greater than that of the individual interior and exterior discharge ports 66, 70, the projectile 82 will be retained within the inflator 30 during operation so as to not enter the confinement 158.

Figure 18:
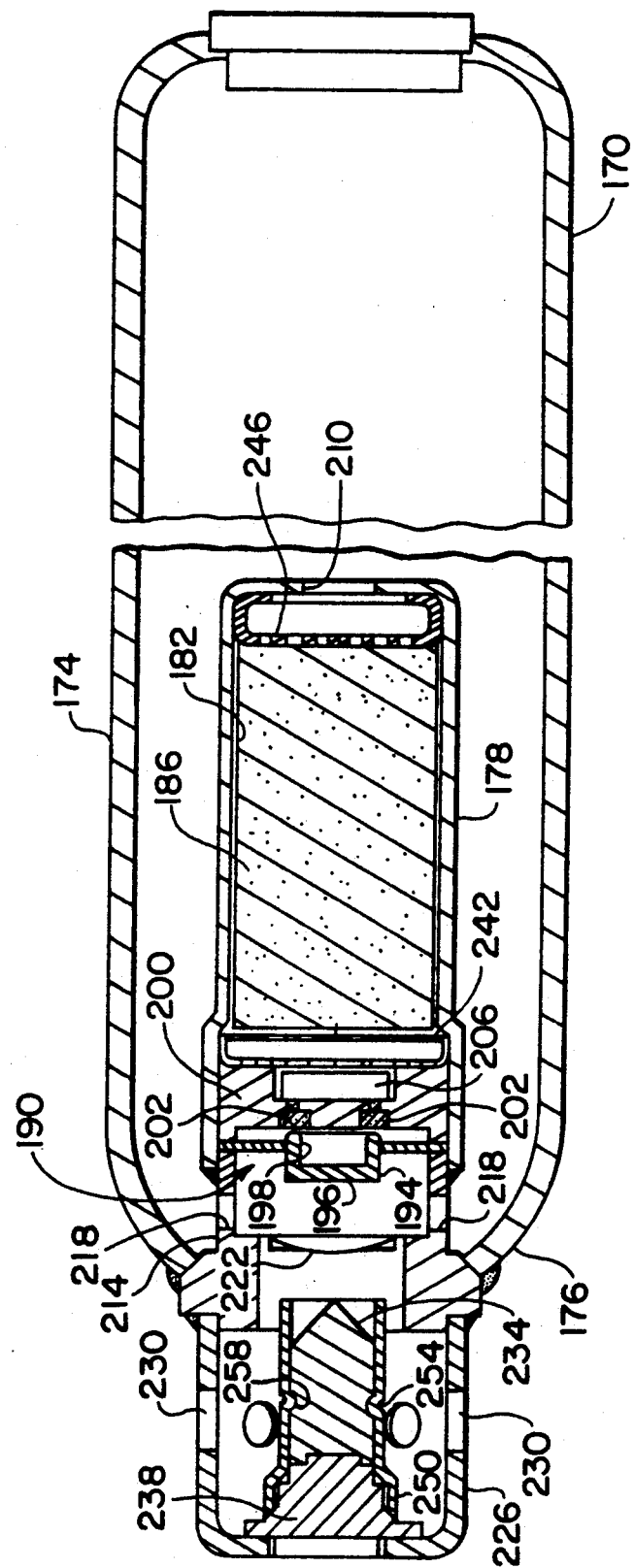
FIG. 18 is a longitudinal cross-sectional view of an inflator utilizing a dual function projectile in accordance with another embodiment of the present invention.
Figure 19:
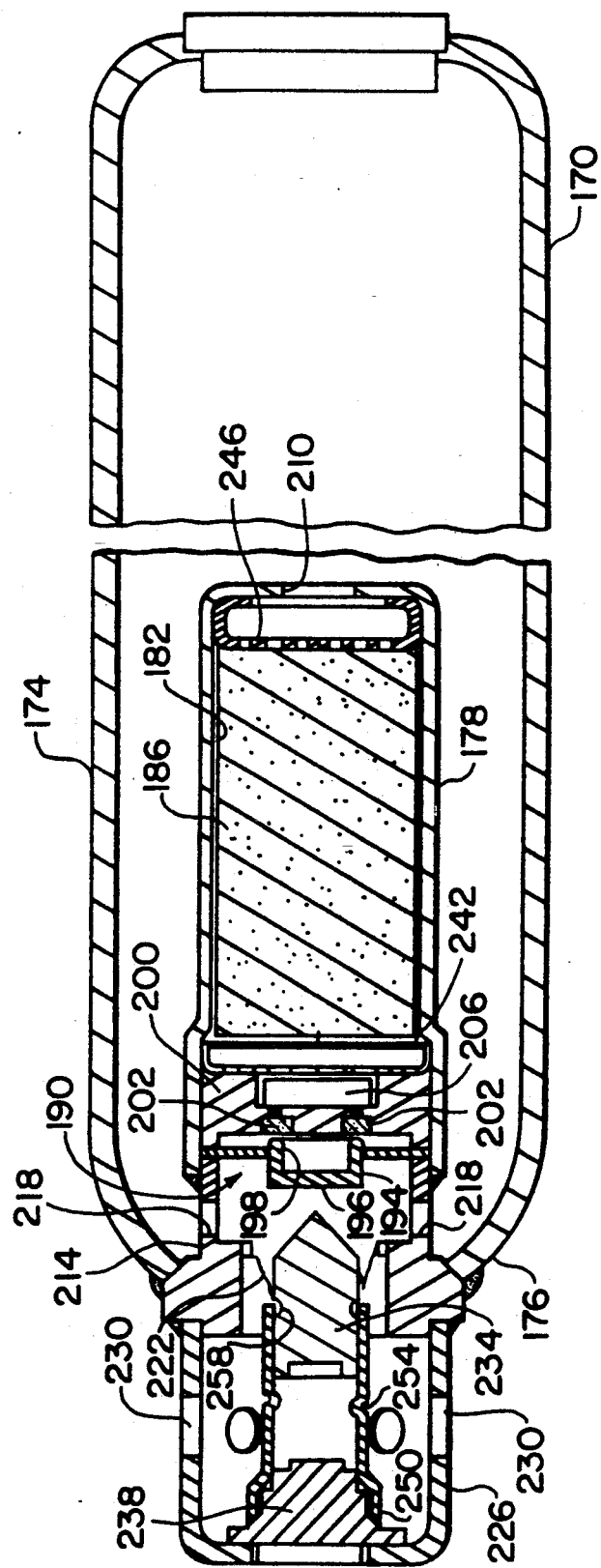
FIG. 19 is the cross-sectional view of the inflator of FIG. 18 after the dual function projectile has passed through the sealing portion of the pressure bottle.
Figure 20:
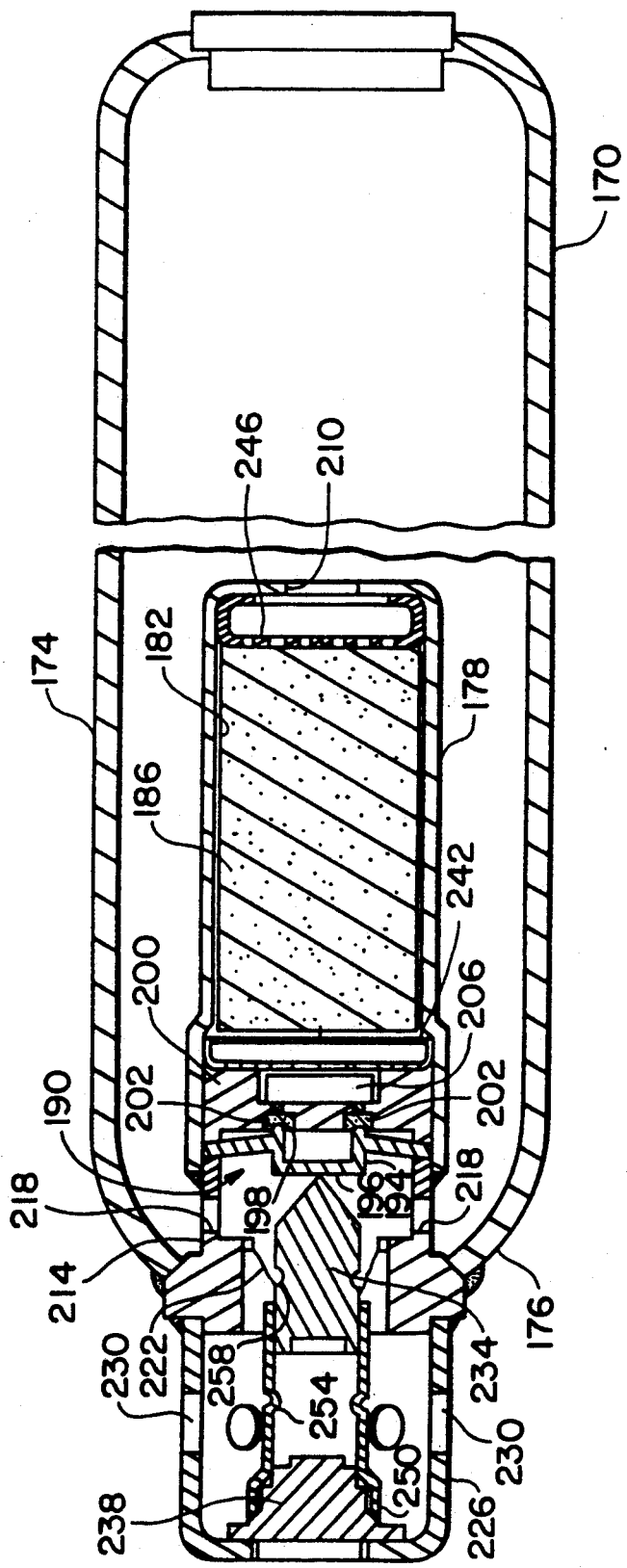
FIG. 20 is the cross-sectional view of the inflator of FIG. 18 after the dual function projectile has impacted the activating portion of the gas generator.

Another embodiment of the present invention is a specially configured inflator 170 which utilizes a dual function projectile 234 as illustrated in FIGS. 18-20. The inflator 170 generally includes a pressure bottle 174 which contains a source of compressed gas, a gas generator 178 having a propellant 186 contained therein, and a projectile 234. When an appropriate signal is received by the inflator 170, the projectile 234 is propelled to provide a flow path for the gas from the pressure bottle 174 and to impact a portion of the gas generator 178 to ignite the propellant 186. As will be appreciated based upon the following discussion, the inflator 170, more particularly its performance characteristics, makes it particularly useful for incorporation into the inflatable safety system 22 of FIG. 1, thereby replacing inflator 30 as described hereinabove. Consequently, the dual function projectile embodiment of FIGS. 18-20 will be described with reference to supplying a gas to the inflatable confinement 158 of FIG. 1.

Figure 22:
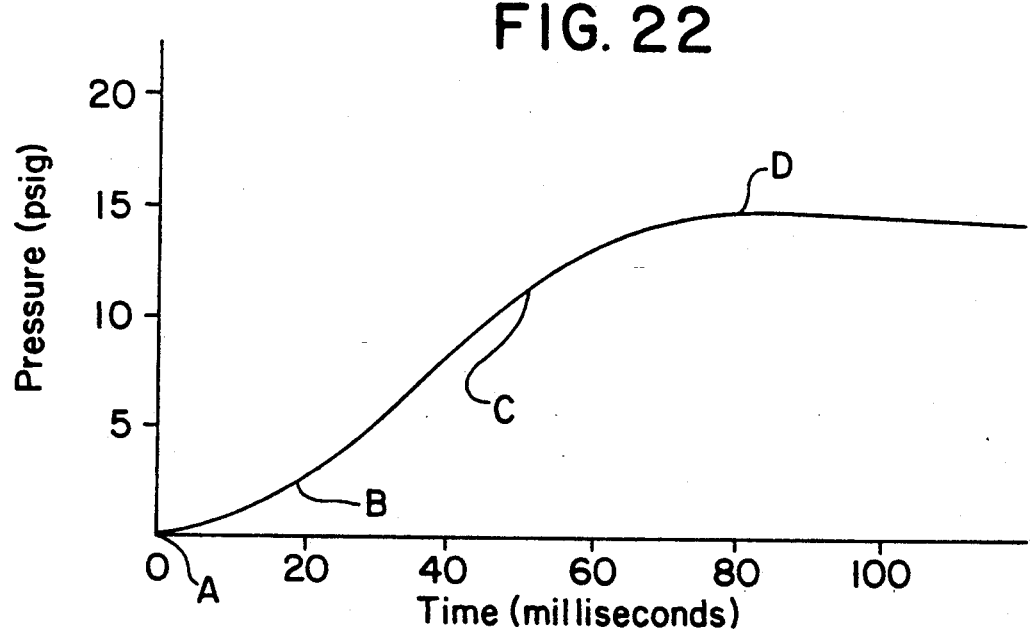
FIG. 22 is an exemplary performance curve for the operation of the inflator of FIG. 18, illustrating the pressure buildup rate of a fix-wall container interconnected with the inflator.

Referring to FIG. 18, the pressure bottle 174 contains a source of an appropriate gas for initially inflating the confinement 158 (FIG. 1) which is typically maintained at a pressure ranging from 2,100 psi to 3,900 psi, depending upon the ambient temperature. Although various gases may be appropriately used, argon is preferred based upon its inertness and toxicity prevention. Moreover, the high density and molecular weight of argon potentially contributes to achieving the desired performance curve for the inflator 170 as illustrated in FIG. 22 and as will be discussed below.

The stored gas is initially retained within the pressure bottle 174 by a closure disk 222. More particularly, the closure disk 222 is positioned within a disk housing 214 which is attached to the discharge end 176 of the pressure bottle 174 by appropriate methods, such as welding. A plurality of disk housing outlets 218 are positioned on the disk housing 214 to allow the gas within the pressure bottle 174 to fluidly communicate with the interior of the disk housing 214, and thus exert a force on a portion of the closure disk 222 prior to activation of the inflator 170.

When an appropriate signal is received by the inflator 170 from the detector 26 (FIG. 1), the projectile 234 is propelled through the closure disk 222 at an appropriate velocity (as discussed above for projectile 82), as illustrated in FIG. 19, to provide a flow path from the pressure bottle 174 for both the stored gases and for the propellant gases produced by the activation of the gas generator 178 (discussed below). In this regard, the projectile 234 is attached to a squib 238 or other suitable electroexplosive device and is preferably in substantial alignment with the central region of the closure disk 222. The squib 238, which is electrically interconnected with the detector 26 (FIG. 1), and the projectile 234 are retained within a manifold connector 226 which is positioned on the end of the disk housing 214 downstream of the closure disk 222. Consequently, the squib 238 and the projectile 234 are desirably not initially exposed to the stored gas within the pressure bottle 174, thereby reducing the complexity of utilizing this type of an activation device for the inflator 170. A plurality of manifold outlets 230 are also positioned on the manifold connector 226 to provide fluid communication with the confinement 158 via the conduit 154 (FIG. 1) once the projectile 234 passes through the closure disk 222. A flow path from the pressure bottle 174 to the confinement 158 (FIG. 1) is therefore established once the projectile 234 passes through the closure disk 222, namely from the pressure bottle 174 through the disk housing outlets 218, the disk housing 214, the manifold connector 226, the manifold connector outlets 230, and the conduit 154 (FIG. 1).

After performing this initial function of providing for the above-described flow path, the projectile 234 continues to advance toward the gas generator 178 for purposes of initiating combustion of the propellant 186 contained therein as illustrated in FIGS. 18-20. In this regard, the gas generator 178 is appropriately connected to the disk housing 214, such as by welding, and preferably is in substantial alignment with the projectile 234. Moreover, the gas generator 178 generally includes an ignition assembly 190, positioned adjacent to the disk housing 214, and a propellant chamber 182 which contains the propellant 186 and which is positioned adjacent to the ignition assembly 190.

The ignition assembly 190 includes an activation plate 194 which is preferably substantially aligned with the projectile 234. One alternative for securing the activation plate 194 is to position it between the end of the disk housing 214 and the notched-out end of the charge holder 200 positioned within the gas generator 178. Consequently, the activation plate 194 is able to deflect toward the charge holder 200 when impacted by the projectile 234 to initiate ignition of the propellant 186 (discussed below). As can be appreciated, it is desirable, however, for this required deflection to occur only when impacted by the projectile 234, and thus the activation plate 194 should have a sufficient "stiffness" so as to reduce the potential for inadvertent ignition of the propellant 186. In order to reduce the distance between the projectile 234 and the activation plate 194 and thus the time between activation of the squib 238 and the impacting of the projectile 234 on the activation plate 194, the activation plate 194 may have a convexly shaped portion 196 which faces the projectile 234.

Deflection of the activation plate 194 is required for activation of the gas generator 178 such that the impacting member 198 positioned on the activation plate 194 will strike at least one of the plurality of percussion primers 202 which are positioned within the notched out region of the charge holder 200. This impacting member 198 may be, for instance, a continuous ring or a plurality of individual extensions. Positioned in proximity to the primers 202 is the ignition charge 206. The charge holder 200, and thus the primers 202 and the ignition charge 206, are maintained between the disk housing 214 and the propellant chamber 182 by a retainer 242 which contacts a shoulder portion of the gas generator 178.

After the projectile 234 passes through the closure disk 222 and impacts the activation plate 194, the activation plate 194 deflects and the impacting member 198 on the activation plate 194 strikes one or more of the percussion primers 202 aligned therewith as illustrated in FIG. 20. The ignition charge 206 and, thus the propellant 186, are ignited and the gases generated by the combustion of the propellant 186 flow through the gas generator outlet 210 positioned on the discharge end of the gas generator 178. A propellant strainer 246 may be positioned adjacent the gas generator outlet 210 to retain the propellant 186 within the propellant chamber 182.

Summarizing the operation of the inflator 170, the detector 26 (FIG. 1) sends a signal to the squib 238 to fire the projectile 234. The propelled projectile 234 initially passes through the closure disk 222 to open the described passageway between the pressure bottle 174 and the confinement 158 (FIG. 1). The projectile 234, however, continues to advance until it impacts the activation plate 194. Upon impact, the activation plate 194 deflects into a position which causes the impacting member 198 attached thereto to strike at least one of the aligned percussion primers 202, thereby igniting the ignition charge 206 and thus the propellant 186. The propellant gases generated by the combustion of the propellant 186 exit the gas generator outlet 210 positioned on the discharge end of the gas generator 178 and flow to the confinement 158 (FIG. 1) through the above-described flow path.

As can be appreciated, the projectile 234 may assume various configurations in performing its dual functions, namely passing through the closure disk 222 to provide a flow path from the pressure bottle 174 to the confinement 158 (FIG. 1) and impacting the activation plate 194 to initiate the combustion of the propellant 186 in the gas generator 178. For instance, the projectile 234 may be configured as a ball or as the conical projectile 162 of FIG. 13. However, in these instances it is likely that upon passing through the closure disk 222, fragments would be produced as discussed above with regard to the single function projectile embodiment. Consequently, for those configurations of the projectile 234 which do not separate the closure disk 222 in a controlled manner, which is not required by this dual function projectile embodiment, it may be necessary to incorporate a filtering system (not shown) between the inflator 170 and the confinement 158 to remove fragments from the flow so as to not adversely affect performance of the inflatable safety system 22.

In order to alleviate the need for a filtering system, it is preferable for this dual function projectile embodiment to utilize a projectile 234 which is similarly configured to the projectile 82 described above for the single function projectile embodiment to achieve the desired fragmentation reduction feature attendant with its design. Consequently, the projectile 234 would have the plurality of inclined and intersecting faces 86, a tip 90, and a plurality of cutting edges 94 (not shown on projectile 234) to controllably separate the closure disk 222, as illustrated on the projectile 82 of FIGS. 3-8. In order to further reduce the amount of fragments generated upon establishing a flow path from the pressure bottle 174, it is also preferable for the closure disk 222 to have the dome-shaped configuration of the disk 38 discussed above as illustrated in FIGS. 9-0 for the single function projectile embodiment.

The projectile 234 is required to be directed through the closure disk 222 to impact the activation plate 194 and thus has a cavity (not shown) similar to cavity 106 for the projectile 82. A portion of the squib 238 may then be positioned in this cavity such that the forces exerted on the projectile 234 by the ignition of the squib 238 are concentrated so as to effectively guide the projectile 234 on its desired path. In this dual function projectile embodiment, the cavity 106 may be approximately 0.5 inches long.

Since the projectile 234 must pass through the closure disk 222 to impact the activation plate 194, it may be desirable to position the squib 238 and the projectile 234 into a guide sleeve 250. The guide sleeve 250 serves a number of useful purposes. Initially, the guide sleeve 250 directs the projectile 234 toward the closure disk 222 and the activation plate 194 and the squib 238 is also then able to transfer a substantial portion of its activation forces to the projectile 234. Moreover, the guide sleeve 250 may be sufficiently long such that the entire projectile 234 will not leave the sleeve 250 to impact the activation plate 194. Consequently, the projectile 234 may rebound back into the sleeve 250 after impacting the activated plate 194 and is thus retained therein during inflation. Relatedly, the projectile 234 may be positioned in the guide sleeve 250 such that after activation of the squib 238, the projectile 234 will retain a large portion of those activation by-products which, if they entered the gas flow from the inflator 170, could adversely affect the performance of the inflator 170. Furthermore, the sleeve 250 may also have a crimp 254 to engage a groove 258 on the projectile 234 to assist in maintaining the projectile 234 in position prior to ignition of the squib 238.

Although the dual function projectile embodiment of the present invention reduces the complexity for ignition of a gas generator 178, it does so without significantly adversely affecting the overall performance of the inflator 170. As is known in the art, it is desirable to initially inflate the confinement 158 (FIG. 1) to a degree with cold gas (i.e., gas at ambient temperature) before providing hot gas (i.e., gas produced by burning propellant 186 which is at an elevated temperature). This not only reduces thermal deterioration of the confinement 158, but also reduces the potential for the expansion of the confinement 158 itself inflicting injury upon the person contacted by the confinement 158. The dual function projectile embodiment provides this desired feature without requiring a delayed ignition of the gas generator 178.

Generally regarding the operation of the inflator 170 which produces this desired manner of inflation, once the projectile 234 passes through the closure disk 222, the gas stored within the pressure bottle 174 begins to flow through the above-described passageway to the confinement 158. However, the projectile 234 also impacts the activation plate 194 to ignite the propellant 186 shortly thereafter without the monitoring of any other event or condition. Before the gas generator 178 reaches its operating pressure, the pressure within the pressure bottle 174 will drop to a certain degree (i.e., a certain volume of "cold" stored gas is provided to the confinement 158). As the gas generator 178 reaches its operating pressure, the propellant gases generated thereby essentially act as a piston to force that portion of the "cold" stored gas out of the pressure bottle 174 which is positioned between the gas generator outlet 210 and the disk housing outlets 218 and the closure disk 222. Once this "column" of stored gas has been evacuated from the pressure bottle 174, only then is a significant quantity of the propellant gases, which are at an elevated temperature, provided to the confinement 158. Therefore, the confinement 158 is desirably initially inflated with a cooler gas before the propellant gases are provided thereto.

A number of structural features and operational parameters contribute to this desired operation of the inflator 170. For instance, the gas generator outlet 210 is sufficiently separated from the disk housing outlets 218 (the initial exiting passageway from the pressure bottle 174) such that there is a column of "cold" gas which will be provided to the confinement 158 by the piston-like action of the propellant gases. With regard to having the propellant gases possess this piston-like characteristic, it is necessary for there to be little mixing of the propellant gases and the stored gases (i.e., little turbulence). A number of factors contribute to this desired condition. For instance, the gas generator outlet 210 directs the hot propellant gases initially away from the disk housing outlets 218 and the closure disk 222. Moreover, during operation of the gas generator 178 (i.e.), during combustion of the propellant 186), the pressure within the gas generator 178 ranges from only about 0-20% above the pressure within the pressure bottle 174. Furthermore, the gas generator 178 is operated subsonically (i.e., the propellant gases are provided to the pressure bottle 174 at a subsonic rate). As a result, there is very little turbulence generated between the stored gas and the propellant gas. Consequently, the effect is that the propellant gases effectively push the column of stored gas into the confinement 158 before the propellant gases are provided thereto.

Figure 21:
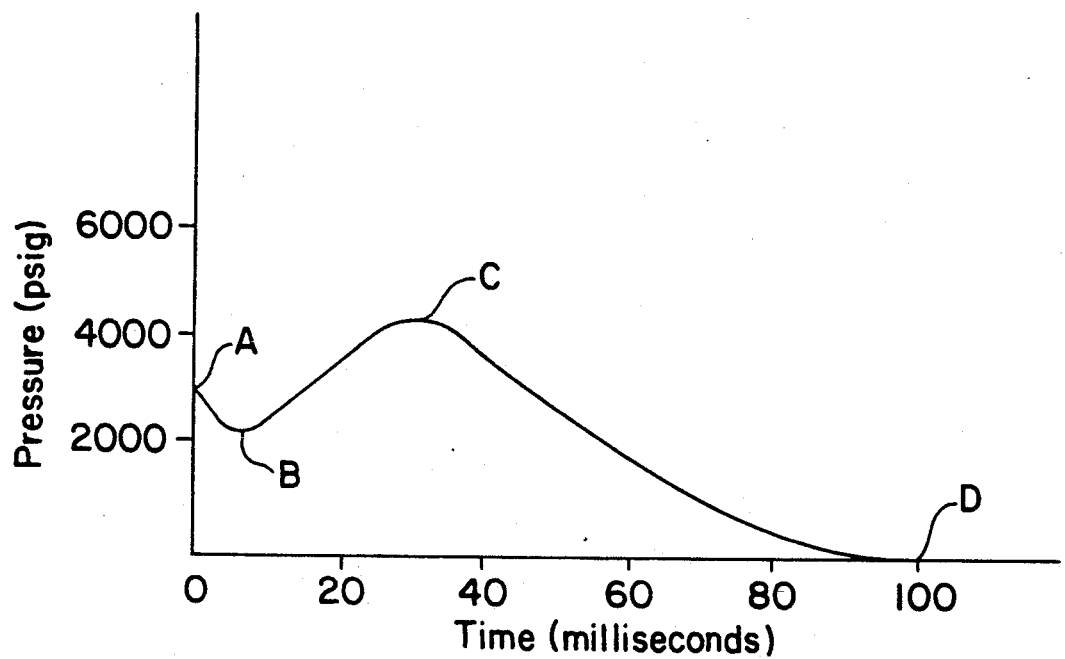
FIG. 21 is an exemplary performance curve for the operation of the inflator of FIG. 18, illustrating the pressure variation in the pressure bottle during inflation.

The operation of the inflator 170 of FIGS. 18-20 is typified by the exemplary performance curves illustrated in FIGS. 21-22. The performance curve of FIG. 21 illustrates the pressure buildup rate within the pressure bottle 174 upon activation of the inflator 170, based upon an initial stored gas pressure of 3000 psi gage within the pressure bottle 174 at 70° F. Point A indicates the point at which the stored gas begins flowing from the pressure bottle 174 to the confinement 158 as a result of the projectile 234 passing through the closure disk 222. As previously stated, the projectile 234 continues on to impact the activation plate 194 to ultimately ignite the propellant 186. Ignition of the propellant 186 actually takes place between points A and B. However, for a short period of time after the propellant 186 is ignited, the pressure within the pressure bottle 174 continues to drop since the gas generator 178 has not yet reached its operating pressure. At point B, which is approximately 5-7 milliseconds after flow is initiated, the gas generator 178 begins providing a sufficient quantity of propellant gases to start increasing the pressure within the pressure bottle 174. The continued combustion of the propellant 186 thereafter increases the pressure within the pressure bottle 174 to a maximum level as indicated at point C, which occurs approximately 30 milliseconds after flow is initiated. Thereafter, the pressure within the pressure bottle 174 decays to a minimum level at point D, which occurs approximately 100 milliseconds after inflation is initiated. Consequently, full inflation of the confinement 158 (FIG. 1) is achieved during this time period.

The pressure buildup curve for a certain fix-walled container (not shown) connected to the inflator 170 is illustrated in FIG. 22, which is effectively indicative of the flow rate provided to the confinement 158 and its expansion. At point A, the stored gas begins flowing from the pressure bottle 174 to the confinement 158 at, effectively, a first flow rate. Between points A and B, the propellant 186 is again activated by the impacting projectile 234 and the propellant gases again force that column of cold gas out of the pressure bottle 174 which is between the gas generator outlet 210 and the disk housing outlets 218. At point B, approximately 20 milliseconds after flow is initiated, the propellant gases actually enter the confinement 158 such that the rate of pressure buildup increases at a higher second level. The confinement pressurization rate of the propellant gases is approximately three times that of the "cold" stored gas. The pressure thereafter builds up at a substantially constant rate until point C, after which the pressure buildup continues to increase but at a somewhat lesser rate as the gas generator 178 nears completion of its operation. At point D, the maximum pressure is achieved after which a slight decay occurs.

The performance curves of FIGS. 21-22 illustrate the desired pressure buildup, and thus the effective flow rate, to the confinement 158. For instance, between points A and B in FIG. 22, the above-described column of cold gas (i.e., the stored gas within the pressure bottle 174), is provided to the confinement 158. This cold gas increases the pressure within the confinement 158 at a first rate so as to reduce thermal deterioration of the confinement 158 and the effects of the expanding confinement on the individual contacting the confinement 158. At point B, the propellant gases are provided to the confinement at the elevated temperature and are then able to achieve a higher rate of pressure buildup to effectively "harden" the confinement 158, but again only after contact is established between the confinement and the individual.

Figure 23:
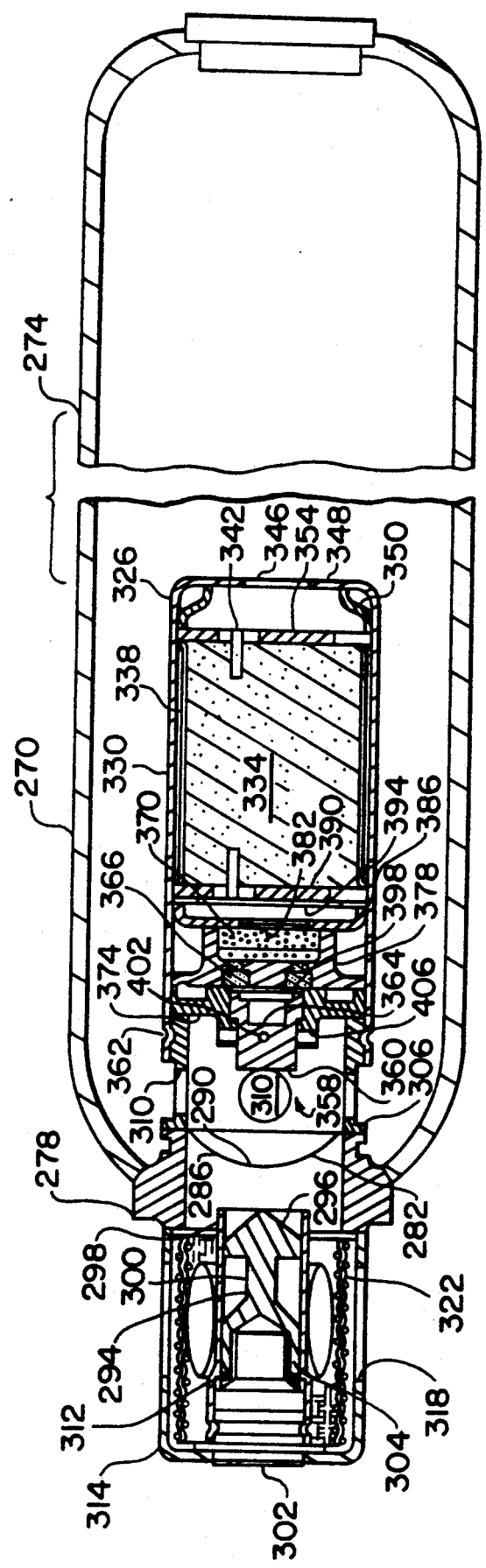
FIG. 23 is a cross-sectional view of a gas generator which utilizes one embodiment of the ignition assembly of the present invention.
Figure 24:
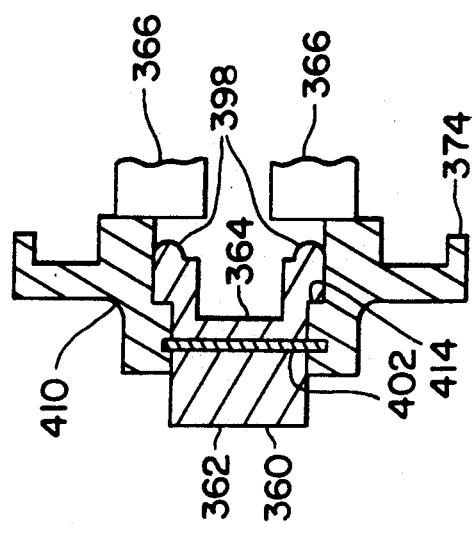
FIG. 24 is an enlarged cross-sectional view of the engagement of the actuation piston by a retention pin.

With reference to FIGS. 23-24, another embodiment of the present invention is directed toward an ignition assembly for a gas generator which may be activated, for instance, by utilizing a projectile of the above-described type. In this regard, the ignition assembly effectively transfers the kinetic energy from the projectile to the activating device, such as the above-described percussion primer(s), while still reducing the potential for preignition of the propellant contained within the gas generator. Moreover, the ignition assembly also acts as a check valve in sealing the gas generator housing such that the propellant gases are properly directed through the gas generator outlet(s) in the desired manner, which improves the consistency of the performance of the inflator. That is, propellant gases are permitted to flow in a first direction but are substantially prevented by the check valve operation from flowing in a second, opposite direction.

An inflator 270 which incorporates one embodiment of the ignition assembly of the present invention is illustrated in FIGS. 23-24. The overall operation and configuration of the inflator 270 is generally similar to the inflator 170 of FIGS. 18-20 discussed above with regard to the dual function projectile embodiment of the present invention, and thus the operation and structural characteristics of the inflator 270 will only be generally referenced herein.

The inflator 270 utilizes a pressure bottle 274 for providing pressurized stored gases to the confinement 158 (FIG. 1) and a gas generator 326 for providing propellant gases in the above-described manner. Consequently, the pressure bottle 274 is connected to an orifice boss 278, and an orifice closure disk 282, appropriately positioned within the orifice boss 278, initially retains the stored gases within the pressure bottle 274. Moreover, a projectile 294 is positioned on the convex side 286 of the orifice closure disk 282 within a barrel 298 and utilizes the propelling forces generated by the activation of a squib 302, such as upon receipt of a signal from a detector 26 in the inflatable safety system 22 (FIG. 1) discussed above, to penetrate and pass through the orifice closure disk 282. The pressurized stored gases within the pressure bottle 274 therefore flow through the plurality of orifices 310 in the orifice sleeve 306, which is connected to the orifice boss 278 on a concave side 290 of the orifice closure disk 282, the screen 322 and orifices 318 in the diffuser 314, and the conduit 154 (if required) to the confinement 158 (FIG. 1).

Figure 25:
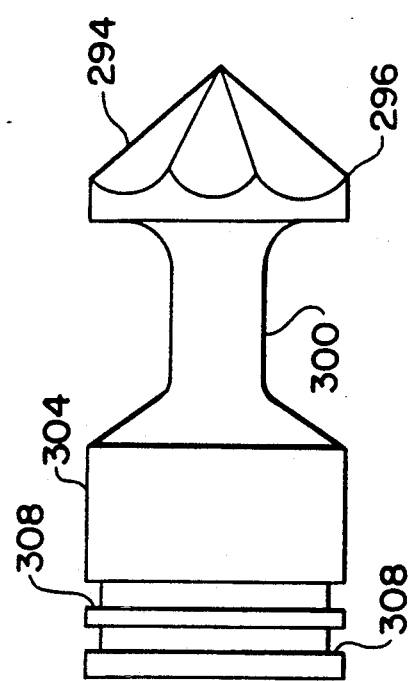
FIG. 25 is a side elevational view of an embodiment of a projectile having a body diameter which is reduced in relation to the projectile head.

As also seen in FIG. 23, the preferred projectile 294 includes a projectile head 296 integrally formed with a body 300 at one end of the head 296 and a base 304 found at the opposite end of the body 300. The projectile head 296 is configured the same as that of the head previously described for projectile 234 and thus provides the advantages attendant with such configuration. However, the body 300 has been modified over the previous embodiment in that it has a reduced diameter or width in comparison with such embodiment in order to facilitate the controlled separation of the orifice closure disk 282 in the manner described above with regard to disk 38. The diameter of the body 300 is preferably less than about one half the diameter of the largest diameter portion of the head 296, which, as can be seen in FIG. 25, is that portion which is connected to the body 300. In one embodiment in which the orifice closure disk 282 has a diameter of 1 inch, the projectile head 296 has a diameter of about 0.5 inch and the body 300 has a diameter of about 3/16 inch. The base 304 also includes grooves 308 for receiving sealing rings 312, as illustrated in FIG. 23. The sealing rings 312 provide a sealing function to assist in the prevention of the flow of gases past the projectile 294, until and unless the inflator 270 is ignited.

A gas generator 326, namely the gas generator housing 330, is appropriately connected to the orifice sleeve 306 and contains a gas generating propellant 334 for augmenting the flow to the confinement 158 (FIG. 1) when ignited by the ignition assembly 358 of the present invention. The propellant 334 is contained within a propellant retainer 338 which is separated from a gas generator outlet 346 on a discharge end 348 of the gas generator housing 330 by a standoff 350 and strainer 354. The strainer 354 is desirable since in one embodiment the propellant 334 is a solid which is maintained within the propellant retainer 338 by pins 342. Consequently, upon ignition of the propellant 334 by the ignition assembly 358, the strainer 354 reduces the potential for the propellant 334 entering the flow from the gas generator 326 through the outlet 346, which could adversely affect the performance of the inflatable safety system 22 (FIG. 1).

The ignition assembly 358 is at least partially positioned within the gas generator housing 330 between the projectile 294 and propellant 334. The ignition assembly 358 generally includes an actuation piston 362, and at least one percussion primer 366 and an ignition material 370 which serve as an activator. More particularly, an actuation retainer 374 engages an end portion of the orifice sleeve 306 and the interior wall of the gas generator housing 330, the actuation retainer 374 thereby functioning at least in part to contain at least a portion of and guide the actuation piston 362 positioned therein. A primer holder 378 engages an end of the actuation retainer 374 and includes a plurality of percussion primers 366 which are positioned substantially adjacent to an ignition material 370, the ignition material 370 being retained within a portion of the primer holder 378 by a cup 382. Each of these percussion primers 366 are substantially aligned with an impacting portion of the actuation piston 362 as discussed below. A retainer 386 and strainer 390 engage the primer holder 378 to complete the interconnection of the ignition assembly 358 to the propellant 334. When the gas generator housing 330 is attached to the orifice sleeve 306, such as by crimping, the gas generator housing 330 has a tendency to lengthen. Consequently, in order to maintain a firm interaction of the foregoing components, a wave spring washer 394 is preferably positioned between the retainer 386 and the strainer 390, although the washer 394 could be located elsewhere in the gas generator housing 330 to achieve this desired function.

An actuation piston 362 is slidably positioned within the actuation retainer 374 and includes a continuous rim projecting member 398 which is substantially aligned with the primers 366. As can be appreciated, a plurality of projecting members (not shown), could replace the substantially continuous rim projecting member 398. A retention pin 402 extends through a portion of the actuation retainer 374 and the actuation piston 362 to initially maintain the position of the actuation piston 362 away from the primers 366. Consequently, the potential for inadvertent engagement of the actuation piston 362 with the percussion primers 366, which could activate the gas generator 326, is reduced. However, after the projectile 294 passes through the orifice closure disk 282, the projectile 294 impacts the actuation piston 362 and shears the retention pin 402 such that the actuation piston 362 is substantially released therefrom. The kinetic energy of the projectile 294 is therefore effectively transferred to the actuation piston 362 and then to the primers 366 such that a sufficient impact will be established with the primers 366 to ignite the ignition material 370, and therefore the propellant 334. Thereafter, the operation of the inflator 270 continues as discussed above with regard to the inflator 170. As can be appreciated, the retention pin 402 may be a retention ring (not shown).

Based upon the interaction of the actuation retainer 374 and actuation piston 362, it can be appreciated that a number of design variations may be utilized. For instance, the force which releases the actuation piston 362 could be a differential pressure which develops during the initial release of the stored gases versus an impacting projectile 294, and various other retaining devices may be used other than the retention pin 402; provided, however, that such retaining devices substantially release the actuation piston 362 so as to not adversely affect the transfer of kinetic energy to the percussion primers 366.

In order to further increase the effective transfer of kinetic energy from the projectile 294 to the primers 366, relief orifices 406 are positioned on the actuation retainer 374 such that the resistance to the motion of the actuation piston 362 toward the primers 366 is reduced. More particularly, any air or other gases between the primer holder 378/primers 366 and the actuation piston 362 are forced out through the relief orifices 406. As can be appreciated, the relief orifices 406 are not necessarily required since there will be some gap between the portions of the actuation piston 362 which are slidably engaged with the actuation retainer 374 through which such air and/or other gases could escape.

As can be appreciated, the actuation piston 362 experiences substantially significant ballistic pressures when impacted by the projectile 294. For instance, such pressures may range from about 3,000 psi to about 5,000 psi. Consequently, the actuation piston 362 includes a receiving portion 360 which is significantly thick to withstand this impact. In one embodiment, this thickness ranges from about 0.2" to about 0.4" and materials such as 1018 steel or 17-4PH SST are used for the structure of the actuation piston 362. Notwithstanding these characteristics of the actuation piston 362, since a retention pin 402 is utilized to engage and retain the position of the actuation piston 362, the thickness of the receiving portion 360 does not substantially affect the transfer of kinetic energy to the percussion primers 366.

The primary function of the percussion primers 366 is to ignite the ignition material 370. During operation of the gas generator 326, however, the primers 366 may erode, allowing gases generated by combustion of the propellant 334 to flow through the primers 366. Any leakage of propellant gases in this manner may adversely affect the consistency of performance of the inflator 270. These gases, however, desirably act upon the entire area of the actuation piston 362 which faces the primers 366, including the continuous rim projecting member 398 and a concave portion 364 which is positioned interiorly of the continuous rim projecting member 398, to move the piston 362 to provide the sealing function described below. As can be appreciated, the concave portion 364 can be replaced by alternate configurations which will allow for sufficient projection of the continuous rim projecting member 398 for engagement with the primers 366.

The actuation retainer 374 desirably includes a retainer shoulder portion 410 which engages with a piston shoulder portion 414 of the actuation piston 362 to provide a seal for the gas generator housing 330 which substantially limits any leakage of gases therethrough. In order to assist in defining these shoulder portions 410, 414 and to provide a sufficient surface upon which any leaking propellant gases may act, it is preferred for the cross-sectional area of the actuation piston 362 which faces the primers 366 to be greater than the cross-sectional area of the receiving portion 360 which is engageable by the projectile 294. Consequently, the concave portion 364, the continuous rim projecting member 398, and the area therebetween provide a suitable surface for the force of such gases passing through the primers 366 to act upon and move the actuation piston 362 away from the primers 366. When the actuation piston 362 is moved in this manner, the piston shoulder portion 414 is forced against the retainer shoulder portion 410 to substantially seal the gas generator housing 330 in this region. Therefore, the performance of the inflator 270 is more consistent since the gas generator propellant gases are directed through the gas generator outlet 346 to perform in the above-described manner.

The foregoing description of the invention has been presented for purposes of illustration and description. Further, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known of practicing the invention and to enable others skilled in the art to utilize the invention in such, or other, embodiments and with the various modifications required by the particular applications or uses of the invention. It is intended that the appended claims be construed to include alternative embodiments to the extent permitted by the prior art.

What is claimed is:

1. An ignition assembly for a gas generator in a motor vehicle inflatable safety system, said gas generator having a propellant means for generating propellant gases, upon activation of said ignition assembly, which are provided to said safety system, said ignition assembly comprising:

activator means for igniting said propellant means;
   actuation means for engaging said activator means;
   first means for propelling said actuation means into engagement with said activator means, wherein said propellant means ignites and propellant gases are provided from said gas generator in a predetermined direction; and
   sealing means for substantially reducing the flow of said propellant gases from said gas generator in a direction other than said predetermined direction, wherein said sealing means moves from an inoperative to an operative position after ignition of said propellant means.

2. An assembly, as claimed in claim 1, wherein:

said actuation means comprises a piston having at least one projecting member for engaging said activator means.

3. An assembly, as claimed in claim 1, wherein:
said actuation means comprises a piston having a plurality of projecting members.

4. An assembly, as claimed in claim 3, wherein:
said activator means comprises a plurality of percussion primers, each of said percussion primers being substantially aligned with one of said projecting members.

5. An assembly, as claimed in claim 1, wherein:
said actuation means comprises a piston having a concave portion facing said activator means.

6. An assembly, as claimed in claim 1, wherein:
said activator means comprises at least one percussion primer which is substantially aligned with said actuation means.

7. An assembly, as claimed in claim 1, wherein:
said activator means comprises at least one percussion primer and an ignition material, said ignition material being positioned between said at least one percussion primer and said propellant means.

8. An assembly, as claimed in claim 1, wherein:
said first is a projectile.

9. An assembly, as claimed in claim 1, further comprising:
means for guiding said actuation means toward said activator means.

10. An assembly, as claimed in claim 1, further comprising:
housing means for containing said propellant means and at least a portion of said activator means, said propellant means being positioned between a first end of said housing means and said activator means.

11. An assembly, as claimed in claim 10, further comprising:
actuation support means, interconnected with said housing means, for supporting at least a portion of said actuation means and for guiding said actuation means toward said activator means in a first direction.

12. An assembly, as claimed in claim 11, further comprising:
orifice means on said actuation support means for releasing any gases compressed during movement of said actuation means in said first direction.

13. An assembly, as claimed in claim 11, wherein:
said sealing means comprises a first sealing portion on said actuation support means which is engageable with a second sealing portion on said actuation means.

14. An assembly, as claimed in claim 11, wherein said sealing means comprises:
a first sealing portion on said actuation support means engageable with a second sealing portion on said actuation means:
a concave portion on said actuation means which faces said activator means, whereby gases flowing through said activator means exert a force on said concave portion to move said actuation means and engage said first and second sealing portions.

15. An assembly, as claimed in claim 1, further comprising:
retention means for separating said actuation means from said activator means, wherein said first means exerts a force on said actuation means to overcome said retention means.

16. An assembly, as claimed in claim 15, wherein:
said retention means comprises a retention pin.

17. An assembly, as claimed in claim 1, wherein:
all portions of said actuation means move substantially the same distance for said actuation means to engage said activator means.

18. An inflator for a motor vehicle inflatable safety system, comprising:
housing means for containing a gas generating propellant;
ignition means, interconnected with said housing means, for igniting said propellant, said ignition means comprising an activator means for igniting said propellant, an actuation means for engaging said activator. means, and a retention means for retaining said actuation means in a first position;
actuation support means, interconnected with said housing means, for containing at least a portion of and guiding said actuation means toward said activator means;
projectile means for impacting said actuation means to propel said actuation means from said first position into engagement with said activator means to ignite said propellant; and
means for sealing said actuation means against said actuation support means, said sealing being affected by movement of said actuation means away from said activator means after impacting said activator means.

19. An inflator, as claimed in claim 18, wherein:
said actuation means comprises a piston having at least one projecting member for contacting at least a portion of said activator means.

20. An inflator, as claimed in claim 18, wherein:
said actuation means comprises a piston having a plurality of projecting members for contacting at least a portion of said activator means in a plurality of locations.

21. An inflator, as claimed in claim 20, wherein:
said activator means comprises a plurality of percussion primers, each said percussion primer being substantially aligned with one of said projecting members.

22. An inflator, as claimed in claim 18, wherein:
a portion of said actuation means which faces said activator means has a greater cross-sectional area than a portion of said actuation means which is engageable by said projectile means.

23. An inflator, as claimed in claim 18, wherein:
said activator means comprises at least one percussion primer and an ignitable material.

24. An inflator, as claimed in claim 18, wherein:
said retention means is a retention pin which engages said actuation means.

25. An inflator, as claimed in claim 18, wherein:
said retention means is a retention pin which engages said actuation means and said actuation support means.

26. An inflator, as claimed in claim 18, wherein:
said actuation support means comprises a first sealing portion engageable with a second sealing portion of said actuation means, the engagement of said first and second sealing portions substantially restricting the flow of gases from said housing means through said actuation support means and said actuation means.

27. An inflator, as claimed in claim 26, wherein:
said actuation means comprises a concave portion which faces said activator means, whereby gases flowing through said activator means exert a force on said concave portion to move said actuation means to engage said first and second sealing portions.

28. An inflator, as claimed in claim 18, wherein:
said actuation support means further comprises orifice means for reducing the resistance to the movement of said actuation means toward said activator means.

29. An assembly, as claimed in claim 18, wherein:
all portions of said actuation means move substantially the same distance for said actuation means to engage said activator means.

30. A method for activating an inflator in a motor vehicle inflatable safety system, comprising the steps of:
retaining a stored gas in a housing:
releasing said stored gas;
providing an actuation support, said actuation support being interconnected with a gas generator positioned within said housing, said gas generator containing a propellant means for providing propellant gases and having an activator means for igniting said propellant means;
positioning an actuation piston means for engaging said activator means at least partially within said actuation support;
moving said actuation piston means in a first direction toward said activator means;
engaging said actuation piston means and said activator means to ignite said propellant means; and
moving said actuation piston means in a second direction opposite said first direction to seal at least a portion of said actuation piston means against at least a portion of said actuation support, wherein the flow of gases through said actuation support and said actuation piston means is substantially limited.

31. A method, as claimed in claim 30, further comprising the steps of:
retaining said actuation piston means relative to said actuation support in a first position with a retaining device; and
impacting said actuation piston means to overcome said retaining device before said moving said actuation piston means in a first direction step.

32. A method, as claimed in claim 30, further comprising the step of:
releasing any gases compressed during said moving said actuation piston means in a first direction step.

33. A method for providing propellant gases to a motor vehicle inflatable safety system, comprising the steps of:
igniting a propellant means for generating propellant gases, said propellant means being positioned in a gas generator having at least one gas generator outlet, wherein said igniting step creates a flow path from said gas generator for said propellant gases in addition to said at least one gas generator outlet;
providing said propellant gases to said system from said gas generator through said at least one gas generator outlet;
sealing said flow path after said igniting step and during at least a portion of said providing step.

34. An apparatus for providing a supply of gas, comprising:
first housing means for containing a pressurized gas;
gas generator means for providing a propellant gas;
projectile means for opening a sealing portion of said first housing means to release said pressurized gas and for impacting an activating portion of said gas generator means to generate said propellant gas, wherein said projectile means has head and body portions with said head portion leading said body portion and said entire head portion penetrating and passing through said sealing portion, adjacent parts of said head and body portions having different sizes, said adjacent part of said head portion having a greater size than said adjacent part of said body portion.

35. An apparatus, as claimed in claim 34, further comprising:

36. An apparatus, as claimed in claim 34, wherein:
said head portion is engageable with said activating portion of said gas generator means.

37. An apparatus, as claimed in claim 34, wherein:
said adjacent part of said head portion has a greater circumference than said adjacent part of said body portion.

38. An apparatus, as claimed in claim 34, wherein:
said projectile means has a central axis and said head portion further comprises a first head portion which generally tapers away from said central axis toward said adjacent part of said head portion.

39. An apparatus, as claimed in claim 34, further comprising:
sleeve means for guiding said projectile means toward said activating portion of said gas generator means.

40. An apparatus, as claimed in claim 39, wherein:
said head portion and at least a portion of said adjacent part of said body portion extend beyond an end of said sleeve means when said head portion engages said activating portion of said gas generator means, said adjacent part of said body portion interconnecting said head portion and a first body part of said body portion which is at least partially retained within said sleeve means.

41. An apparatus, as claimed in claim 34, wherein:
said opened sealing portion comprises a plurality of segments which remain attached to said first housing means after said at least a portion of said projectile means penetrates and passes therethrough, said segments moving in a direction substantially opposite of a direction of movement of said projectile means, whereby said segments are free from substantial engagement with said body portion during said movement of said segments.

42. An inflator for a motor vehicle inflatable safety system, comprising:
housing means for containing a gas generating propellant;
ignition means, interconnected with said housing means, for igniting said propellant, said ignition means comprising an activator means for igniting said propellant, an actuation means for engaging said activator means, and a retention means for retaining said actuation means in a first position, said actuation means comprising a piston having a plurality of projecting members for contacting at least a portion of said activator means in a plurality of locations; and projectile means for impacting said actuation means to propel said actuation means from said first position into engagement with said activator means to ignite said propellant.

43. An inflator, as claimed in claim 42, wherein:
said activator means comprises a plurality of percussion primers, each said percussion primer being substantially aligned with one of said projecting members.

44. An inflator for a motor vehicle inflatable safety system, comprising:
housing means for containing a gas generating propellant;
ignition means, interconnected with said housing means, for igniting said propellant, said ignition means comprising an activator means for igniting said propellant, an actuation means for engaging said activator means, and a retention means for retaining said actuation means in a first position; and
projectile means for impacting said actuation means to propel said actuation means form said first position into engagement with said activator means to ignite said propellant, wherein a portion of said actuation means which faces said activator means has a greater cross-sectional area than a portion of said actuation means which is engageable by said projectile means.

45. An inflator for a motor vehicle inflatable safety system, comprising:
housing means for containing a gas generating propellant;
ignition means, interconnected with said housing means, for igniting said propellant, said ignition means comprising an activator means for igniting said propellant, an actuation means for engaging said activator means, a retention means for retaining said actuation means in a first position, and an actuation support means, interconnected with said housing means, for engaging at least a portion of said actuation means, said actuation support means comprising a first sealing portion engageable with a second sealing portion of said actuation means; and
projectile means for impacting said actuation means to propel said actuation means from said first position into engagement with said activator means to ignite said propellant, wherein said actuation means comprises a concave portion which faces said activator means whereby gases flowing through said activator means exert a force on said concave portion to move said actuation means to engage said first and second sealing portions and wherein the engagement of said first and second sealing portions substantially restricts the flow of gases from said housing means through said actuation support means and said actuation means.

46. An inflator for a motor vehicle inflatable safety system, comprising:
housing means for containing a gas generating propellant;
ignition means, interconnected with said housing means, for igniting said propellant, said ignition means comprising an activator means for igniting said propellant, an actuation means for engaging said activator means, a retention means for retaining said actuation means in a first position, and an actuation support means, interconnected with said housing means, for engaging at least a portion of said actuation means; and
projectile means for impacting said actuation means to propel said actuation means from said first position into engagement with said activator means to ignite said propellant, wherein said actuation support means further comprises orifice means for reducing resistance to the movement of said actuation means toward said activator means.

* * * * *